US012455011B2

(12) United States Patent
Inoue et al.

(10) Patent No.: US 12,455,011 B2
(45) Date of Patent: Oct. 28, 2025

(54) OUTBOARD MOTOR AND SEAL FOR OUTBOARD MOTOR

(71) Applicant: YAMAHA HATSUDOKI KABUSHIKI KAISHA, Iwata (JP)

(72) Inventors: Kazuhiko Inoue, Hiroshima (JP); Kentaro Toya, Shizuoka (JP); Hiroyuki Hasegawa, Shizuoka (JP)

(73) Assignee: YAMAHA HATSUDOKI KABUSHIKI, Shizuoka (JP)

( * ) Notice: Subject to any disclaimer, the term of this patent is extended or adjusted under 35 U.S.C. 154(b) by 0 days.

(21) Appl. No.: 18/952,090

(22) Filed: Nov. 19, 2024

(65) Prior Publication Data

US 2025/0164008 A1 May 22, 2025

(30) Foreign Application Priority Data

Nov. 22, 2023 (JP) .................. 2023-198393

(51) Int. Cl.
*F16J 15/06* (2006.01)
*B63H 20/32* (2006.01)

(52) U.S. Cl.
CPC .............. *F16J 15/06* (2013.01); *B63H 20/32* (2013.01)

(58) Field of Classification Search
CPC ................... F16J 15/06; B63H 20/32
See application file for complete search history.

(56) References Cited

U.S. PATENT DOCUMENTS

| 3,936,059 A * | 2/1976 | Gordon ................. F16J 15/106 277/648 |
| 4,630,835 A * | 12/1986 | Locacius ................ F02F 11/002 277/596 |
| 2011/0198845 A1* | 8/2011 | LaFleur ............. H01L 21/0243 277/612 |
| 2015/0101859 A1* | 4/2015 | Dabusc ................. F16J 15/062 174/358 |
| 2019/0173222 A1* | 6/2019 | Oka ................... H01R 13/5202 |

FOREIGN PATENT DOCUMENTS

JP 2010137787 A 6/2010

* cited by examiner

*Primary Examiner* — Vishal A Patel
(74) *Attorney, Agent, or Firm* — Keating & Bennett, LLP

(57) ABSTRACT

An outboard motor includes a seal to seal a space between a peripheral edge of a shroud opening and a peripheral edge of a cowl opening. The seal includes a base plate fixed to the peripheral edge of the shroud opening and a rectangular annular seal lip extending from the base plate in elastic contact with the peripheral edge of the cowl opening. The rectangular annular seal lip includes a hollow first seal lip including a first lip portion including a first base end and a first front end, a second lip portion including a second base end and a second front end, and a hollow portion between the first lip portion and the second lip portion. The first lip portion and the second lip portion have a chevron shape in cross-section inclined in mutually opposite directions.

13 Claims, 13 Drawing Sheets

OUTBOARD MOTOR AND SEAL FOR OUTBOARD MOTOR

CROSS REFERENCE TO RELATED APPLICATIONS

This application corresponds to Japanese Patent Application No. 2023-198393 filed in the Japan Patent Office on Nov. 22, 2023, the entire disclosure of which is incorporated herein by reference.

BACKGROUND OF THE INVENTION

1. Field of the Invention

The present disclosure relates to outboard motors and seals for outboard motors.

2. Description of the Related Art

An engine serving as a power source is built into an outboard motor attached to a hull. A heat exhaust opening through which heat of the engine is discharged, an air intake opening through which intake air of the engine is inhaled, etc., are formed in a cover of the outboard motor. For example, in an outboard motor disclosed by Japanese Patent Application Publication No. 2010-137787, a sealing material is interposed between a passage formation portion formed at a ceiling wall that is a part of an engine cover and an entrance duct molded integrally with an upper case that is a constituent of an intake air silencer. A space between the passage formation portion and the entrance duct is sealed with the sealing material.

This sealing material is made of an elastic material having rubbery properties, and includes a fixed portion that is fixed to a peripheral edge portion of the entrance duct and a lip that is in close contact with a peripheral edge portion of the passage formation portion. The fixed portion has a plate shape that annularly extends along the peripheral edge portion of the entrance duct. The lip protrudes upwardly from a surface on the passage formation portion side of the fixed portion, and annularly extends in the same way as the fixed portion, and is curved such as to be placed at a more outward position in the radial direction in proportion to a rise in the upward direction.

In an outboard motor, an engine cover is arranged such as to be detachable from an outboard motor main body in order to perform maintenance for an engine or the like. In the outboard motor disclosed by Japanese Patent Application Publication No. 2010-137787, the engine cover is arranged such as to be moved in the up-down direction with respect to the outboard motor main body when the engine cover is detached. In other words, when the engine cover is attached to the outboard motor main body, the engine cover is placed above the outboard motor main body, and then is downwardly moved, and, as a result, the engine cover presses the lip from above the lip. At this time, the lip of the sealing material upwardly protrudes, and has a correspondence relationship with the moving direction of the engine cover, and therefore it is possible to naturally press the lip from above, and it is conceivable that the turn-up, etc., of the lip does not occur.

However, in recent years, there has been a desire to form an opening portion through which heat exhaust or air intake is performed in an inclined surface, for the structure, the design, or the like of the outboard motor. In such a case, a sealing material that is fixed to the peripheral edge portion of the opening portion is also placed in an inclined state, and, as a result, the protruding direction of the lip is also faced in an inclined direction. In this state, if the engine cover is downwardly moved when the engine cover is attached, a back surface of the engine cover will push the lip obliquely downwardly because there is no correspondence relationship between the protruding direction of the lip and the moving direction of the engine cover. At this time, a friction force generated between the lip and the back surface of the engine cover is large because the lip is made of an elastic material having rubbery properties. Therefore, there is a concern that the lip will cause disadvantageous deformation, such as the turn-up of the lip, and sealability will be lowered.

SUMMARY OF THE INVENTION

Example embodiments of the present invention provide outboard motors that are capable of obtaining high sealability by preventing disadvantageous deformation of a seal.

An example embodiment of the present invention provides an outboard motor including a shroud to cover an engine, a cowl to cover the shroud from above, and a seal. The shroud includes a shroud inclined surface having a rectangular shroud opening and inclined with respect to a horizontal direction. The cowl includes a cowl inclined surface having a rectangular cowl opening, inclined with respect to the horizontal direction, and facing the shroud inclined surface. The seal seals a space between a peripheral edge of the shroud opening and a peripheral edge of the cowl opening.

The seal includes a base plate to be fixed to the peripheral edge of the shroud opening and having a rectangular annular shape including a diagonal center line and a rectangular annular seal lip extending from the base plate and located around the diagonal center line. The base plate includes a first attachment plate, a second attachment plate, a third attachment plate, and a fourth attachment plate that are rectangularly arranged. The first attachment plate is located at a higher position than the third attachment plate when seen from a left-right direction. The rectangular annular seal lip elastically contacts with the peripheral edge of the cowl opening. The rectangular annular seal lip includes a hollow first seal lip, a second seal lip, a third seal lip, and a fourth seal lip.

The first seal lip includes a first lip portion, a second lip portion, and a hollow portion between the first lip portion and the second lip portion. The first lip portion includes a first base end connected to the first attachment plate and a first front end. The second lip portion includes a second base end and a second front end, the second base end being closer to the diagonal center line than the first lip portion and being supported by the peripheral edge of the shroud opening, the second front end being connected to the first front end of the first lip portion. The first lip portion further includes a surface contact region that extends to the first front end from a halfway portion between the first base end and the first front end and that elastically contacts with the peripheral edge of the cowl opening. The first lip portion and the second lip portion have a chevron shape in cross-section inclined in mutually opposite directions.

The second seal lip includes a base end connected to the second attachment plate and a front end that elastically contacts with the peripheral edge of the cowl opening. The third seal lip includes a base end connected to the third attachment plate and a front end that elastically contacts the peripheral edge of the cowl opening. The fourth seal lip includes a base end connected to the fourth attachment plate and a front end that elastically contacts the peripheral edge of the cowl opening. Each of the second seal lip, the third seal lip, and the fourth seal lip extends away from the diagonal center line with increasing distance toward the front end of each corresponding seal lip from the base end of each corresponding seal lip.

With this arrangement, let it be supposed that, when the cowl is attached from above in a state in which the base plate of the seal has been fixed to the peripheral edge of the shroud opening, the cowl inclined surface descends while being first brought into contact with the first seal lip slidably in a direction approaching the diagonal center line among the rectangular annular seal lips. In this case, the first lip portion of the first seal lip is bent and deformed in a state of being supported by the second lip portion. A portion, which extends to the first front end from a halfway portion between the first front end and the first base end, of the first lip portion defines a surface contact region that elastically comes into surface contact with the peripheral edge of the cowl opening. Therefore, it is possible to reduce or prevent conventional disadvantageous deformation, such as turn-up. Therefore, it is possible to obtain high sealability.

Additionally, each of the second seal lip, the third seal lip, and the fourth seal lip extend away from the diagonal center line with increasing distance toward the front end of each corresponding seal lip from the base end of each corresponding seal lip. When the cowl is attached, the cowl inclined surface that has passed by the first seal lip is slidably brought into contact with the second seal lip and the fourth seal lip, and is then moved such as to slidably come into contact with the third seal lip. At this time, the second seal lip, the third seal lip, and the fourth seal lip are bent and deformed so as to extend away from the diagonal center line. In other words, conventional disadvantageous deformation, such as turn-up, does not occur in the second seal lip, the third seal lip, and the fourth seal lip. Therefore, it is possible to obtain high sealability.

In an example embodiment, the second base end of the second lip portion of the first seal lip orthogonally presses in contact with the shroud inclined surface. The shroud inclined surface includes a step by which the second base end of the second lip portion is locked. This arrangement makes it possible to increase the effect of allowing the second lip portion to support the first lip portion. Therefore, it is possible to achieve an excellent surface-contact state of the surface contact region of the first lip portion, and is possible to further increase sealability.

In an example embodiment, the surface contact region of the first lip portion of the first seal lip, the front end of the second seal lip, the front end of the third seal lip, and the front end of the fourth seal lip are located on a same plane provided by the peripheral edge of the cowl opening. This arrangement enables the upper-side seal lip, the left-side seal lip, the lower-side seal lip, and the right-side seal lip to closely adhere to the peripheral edge of the cowl opening without gaps, thus enabling these lips to increase sealability.

In an example embodiment, the first attachment plate includes a mold removal hole in communication with the hollow portion of the first seal lip. The second base end of the second lip portion of the first seal lip is separate from the first attachment plate through the mold removal hole. This arrangement makes it possible to easily perform die cutting through the mold removal hole when the hollow first seal lip is molded.

In an example embodiment, the first attachment plate is located at a more rearward position and at a more upward position than the third attachment plate when seen from the left-right direction. The seal includes an upper side portion including an upper-side attachment plate as the first attachment plate and an upper-side seal lip as the first seal lip. Additionally, the seal includes a left side portion including a left-side attachment plate as the second attachment plate and a left-side seal lip as the second seal lip. Additionally, the seal includes a lower side portion including a lower-side attachment plate as the third attachment plate and a lower-side seal lip as the third seal lip. Additionally, the seal includes a right side portion including a right-side attachment plate as the fourth attachment plate and a right-side seal lip as the fourth seal lip. The upper side portion is located at a rearwardly and obliquely upward position with respect to the lower side portion.

The peripheral edge of the shroud opening includes an upper attachment surface, a left attachment surface, a lower attachment surface, and a right attachment surface. The upper-side attachment plate, the left-side attachment plate, the lower-side attachment plate, and the right-side attachment plate are attached to the upper attachment surface, the left attachment surface, the lower attachment surface, and the right attachment surface of the peripheral edge of the shroud opening, respectively.

This arrangement enables the upper-side seal lip formed by the hollow first seal lip to reduce or prevent conventional disadvantageous deformation, such as turn-up when the cowl is attached. Additionally, the left-side seal lip, the lower-side seal lip, and the right-side seal lip that are respectively formed by the second seal lip, the third seal lip, and the fourth seal lip are bent and deformed to move away from the diagonal center line. Therefore, it is possible to obtain high sealability.

In an example embodiment, the shroud includes a lock surface to intersect the upper attachment surface. The seal includes a lock portion that protrudes from the upper-side attachment plate and is locked with a surface of the shroud.

This arrangement makes it possible to reduce or prevent the positional deviation of the first base end of the first lip portion of the first seal lip when the cowl is attached. Therefore, it is possible to achieve an excellent surface-contact state of the surface contact region of the first lip portion, and is possible to increase sealability.

In an example embodiment, the upper-side attachment plate, the left-side attachment plate, the lower-side attachment plate, and the right-side attachment plate are located on a same plane provided by the upper attachment surface, the left attachment surface, the lower attachment surface, and the right attachment surface of the peripheral edge of the shroud opening.

This arrangement enables the upper attachment surface, the left attachment surface, the lower attachment surface, and the right attachment surface of the peripheral edge of the shroud opening to closely adhere to the upper-side attachment plate, the left-side attachment plate, the lower-side attachment plate, and the right-side attachment plate of the base plate of the seal, respectively, without gaps, thus enabling these surfaces and plates to increase sealability.

In an example embodiment, the seal further includes an upper-left corner portion between the upper side portion and the left side portion, an upper-right corner portion between the upper side portion and the right side portion, a lower-left corner portion between the lower side portion and the left side portion, and a lower-right corner portion between the lower side portion and the right side portion. The upper side portion, the upper-left corner portion, the left side portion, the lower-left corner portion, the lower side portion, the lower-right corner portion, the right side portion, and the upper-right corner portion are consecutively arranged in order, and as a result, the seal has a rectangular annular shape.

In this case, it is possible to consecutively arrange the upper side portion, the upper-left corner portion, the left side portion, the lower-left corner portion, the lower side portion, the lower-right corner portion, the right side portion, and the upper-right corner portion in order so as to have a rectangular annular shape.

In an example embodiment, the rectangular annular seal lip further includes an upper-left seal lip between the upper-side seal lip and the left-side seal lip, an upper-right seal lip between the upper-side seal lip and the right-side seal lip, a lower-left seal lip between the lower-side seal lip and the left-side seal lip, and a lower-right seal lip between the lower-side seal lip and the right-side seal lip. The base plate further includes an upper-left attachment plate between the upper-side attachment plate and the left-side attachment plate, an upper-right attachment plate between the upper-side attachment plate and the right-side attachment plate, a lower-left attachment plate between the lower-side attachment plate and the left-side attachment plate, and a lower-right attachment plate between the lower-side attachment plate and the right-side attachment plate. The upper-left seal lip, the upper-right seal lip, the lower-left seal lip, and the lower-right seal lip are elastically contact with the peripheral edge of the cowl opening.

The upper-left seal lip includes a base end and a front end, the base end being located on the upper-left attachment plate and having an r shape. The upper-right seal lip includes a base end and a front end, the base end being located on the upper-right attachment plate and having an r shape. The lower-left seal lip includes a base end and a front end, the base end being located on the lower-left attachment plate and having an r shape. The lower-right seal lip includes a base end and a front end, the base end being located on the lower-right attachment plate and having an r shape. Each of the upper-left seal lip, the upper-right seal lip, the lower-left seal lip and the lower-right seal lip has a shape moving away from the diagonal center line with increasing distance toward the front end of each corresponding lip from the base end of each corresponding lip. The front end of the lower-left seal lip and the front end of the lower-right seal lip each include an r shape that is concentric with the r shape of the base end of each corresponding lip.

With this arrangement, the upper-left seal lip, the left-side seal lip, the lower-left seal lip, the lower-side seal lip, the lower-right seal lip, the right-side seal lip, and the upper-right seal lip are each bent and deformed in the direction away from the diagonal center line. In other words, conventional disadvantageous deformation, such as turn-up, does not occur in the upper-left seal lip, the left-side seal lip, the lower-left seal lip, the lower-side seal lip, the lower-right seal lip, the right-side seal lip, and the upper-right seal lip. Particularly, the front end of the lower-left seal lip and the front end of the lower-right seal lip include r shapes that are concentric with the r shapes of the base ends corresponding to the front ends, respectively, thus enabling the lower-left seal lip and the lower-right seal lip to be excellently deformed.

In an example embodiment, the seal includes an upper-left lid portion to seal an inside of a triangle whose three sides are a left end of the first lip portion of the first seal lip, a rear end of the upper-left seal lip, and a right end of the upper-left attachment plate. The seal includes an upper-right lid portion to seal an inside of a triangle whose three sides are a right end of the first lip portion, a rear end of the upper-right seal lip, and a left end of the upper-right attachment plate. The upper-side attachment plate includes a mold removal hole to communicate with the hollow portion of the first seal lip. The second base end of the second lip portion of the first seal lip is separate from the upper-side attachment plate through the mold removal hole. An inner surface of the upper-left lid portion and an inner surface of the upper-right lid portion face the mold removal hole through the hollow portion.

This arrangement makes it possible to seal the inside of the triangle whose three sides are the left end of the first lip portion, the rear end of the upper-left seal lip, and the right end of the upper-left attachment plate by the upper-left lid portion. This arrangement makes it possible to seal the inside of the triangle whose three sides are the right end of the first lip portion, the rear end of the upper-right seal lip, and the left end of the upper-right attachment plate the upper-right lid portion. Therefore, the rigidity and sealability of the seal are improved.

Additionally, this arrangement makes it possible to easily remove a mold through the mold removal hole when the hollow first seal lip, the upper-left lid portion, and the upper-right lid portion are molded.

In an example embodiment, a boundary line between a left end of the first lip portion and the upper-left lid portion extends leftward with increasing distance rearwardly. A boundary line between the upper-left lid portion and the upper-left attachment plate extends leftward with increasing distance forwardly. A boundary line between a right end of the first lip portion and the upper-right lid portion extends rightward with increasing distance rearwardly. A boundary line between the upper-right lid portion and the upper-right attachment plate extends rightward with increasing distance forwardly.

With this arrangement, the boundary line between the upper-left lid portion and the upper-left seal lip is located at a more obliquely rightward position with increasing distance upwardly, and the boundary line between the upper-right lid portion and the upper-right seal lip is located at a more obliquely leftward position with increasing distance upwardly. Therefore, because of the presence of the boundary line between the upper-left lid portion and the upper-left seal lip, the upper-left seal lip is bent and deformed in the direction away from the diagonal center line from the base end to the front end.

Additionally, because of the presence of the boundary line between the upper-right lid portion and the upper-right seal lip, the upper-right seal lip is bent and deformed in the direction away from diagonal center line from the base end to the front end.

When the upper-side seal lip is bent and deformed in the direction approaching the diagonal center line, the upper-left seal lip and the upper-right seal lip are bent and deformed in the direction approaching the diagonal center line. At this time, the boundary lines between both the right and left sides serve as distinguishing lines, and enable the conversion of the direction in which the seal lip is bent and deformed to be easily performed, and it is possible to reduce or prevent disadvantageous deformation.

In an example embodiment, the outboard motor further includes a plurality of fasteners each of which fasten the base plate to the shroud. Each of at least the left-side attachment plate and the right-side attachment plate of the base plate includes a through-hole through which the corresponding fastener is inserted.

With this arrangement, at least the left-side attachment plate and the right-side attachment plate are able to be fastened to the shroud, and therefore the base plate of the seal is firmly fixed, and positional deviation of the seal does not easily occur, and a gap is not easily formed between the shroud and the base plate of the seal.

An example embodiment of the present invention provides a seal for an outboard motor including a shroud to cover an engine, and a cowl to cover the shroud from above. The shroud includes a shroud inclined surface inclined with respect to a horizontal direction. The cowl includes a cowl inclined surface facing the shroud inclined surface and inclined with respect to the horizontal direction. The seal seals a space between a peripheral edge of a shroud opening provided in the shroud inclined surface and a peripheral edge of a cowl opening provided in the cowl inclined surface.

The seal for the outboard motor includes a base plate having a rectangular annular shape including a diagonal center line and a rectangular annular seal lip extending from the base plate and located around the diagonal center line. The base plate is configured to be fixed to the peripheral edge of the shroud opening. The base plate includes a first attachment plate, a second attachment plate, a third attachment plate, and a fourth attachment plate that are rectangularly arranged in order. The first attachment plate is located at a higher position than the third attachment plate when seen from a left-right direction.

The rectangular annular seal lip is configured to be elastically contact with the peripheral edge of the cowl opening. The rectangular annular seal lip includes a hollow first seal lip, a second seal lip, a third seal lip, and a fourth seal lip.

The first seal lip includes a first lip portion, a second lip portion, and a hollow portion between the first lip portion and the second lip portion. The first lip portion includes a first base end connected to the first attachment plate and a first front end. The second lip portion includes a second base end and a second front end. The second base end is located closer to the diagonal center line than the first lip portion and supported by the peripheral edge of the shroud opening. The second front end is connected to the first front end of the first lip portion. The first lip portion and the second lip portion have a chevron shape in cross-section that are inclined in mutually opposite directions. In an attached state to the outboard motor, the first lip portion defines a surface contact region that extends to the first front end from a halfway portion between the first base end and the first front end and that elastically contacts the peripheral edge of the cowl opening.

The second seal lip includes a base end connected to the second attachment plate and a front end configured to elastically contact the peripheral edge of the cowl opening. The third seal lip includes a base end connected to the third attachment plate and a front end configured to elastically contact the peripheral edge of the cowl opening. The fourth seal lip includes a base end connected to the fourth attachment plate and a front end configured to elastically contact the peripheral edge of the cowl opening. Each of the second seal lip, the third seal lip, and the fourth seal lip recedes from the diagonal center line with increasing proximity to the front end corresponding to each lip from the base end corresponding to each lip.

With this arrangement, it is possible to realize a seal for an outboard motor capable of achieving high sealability by preventing disadvantageous deformation that occurs when the cowl is attached.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

The following example embodiments are merely examples, and are not intended to limit the present invention, products to which the present invention is applied, or usage of the products.

Figure 1:
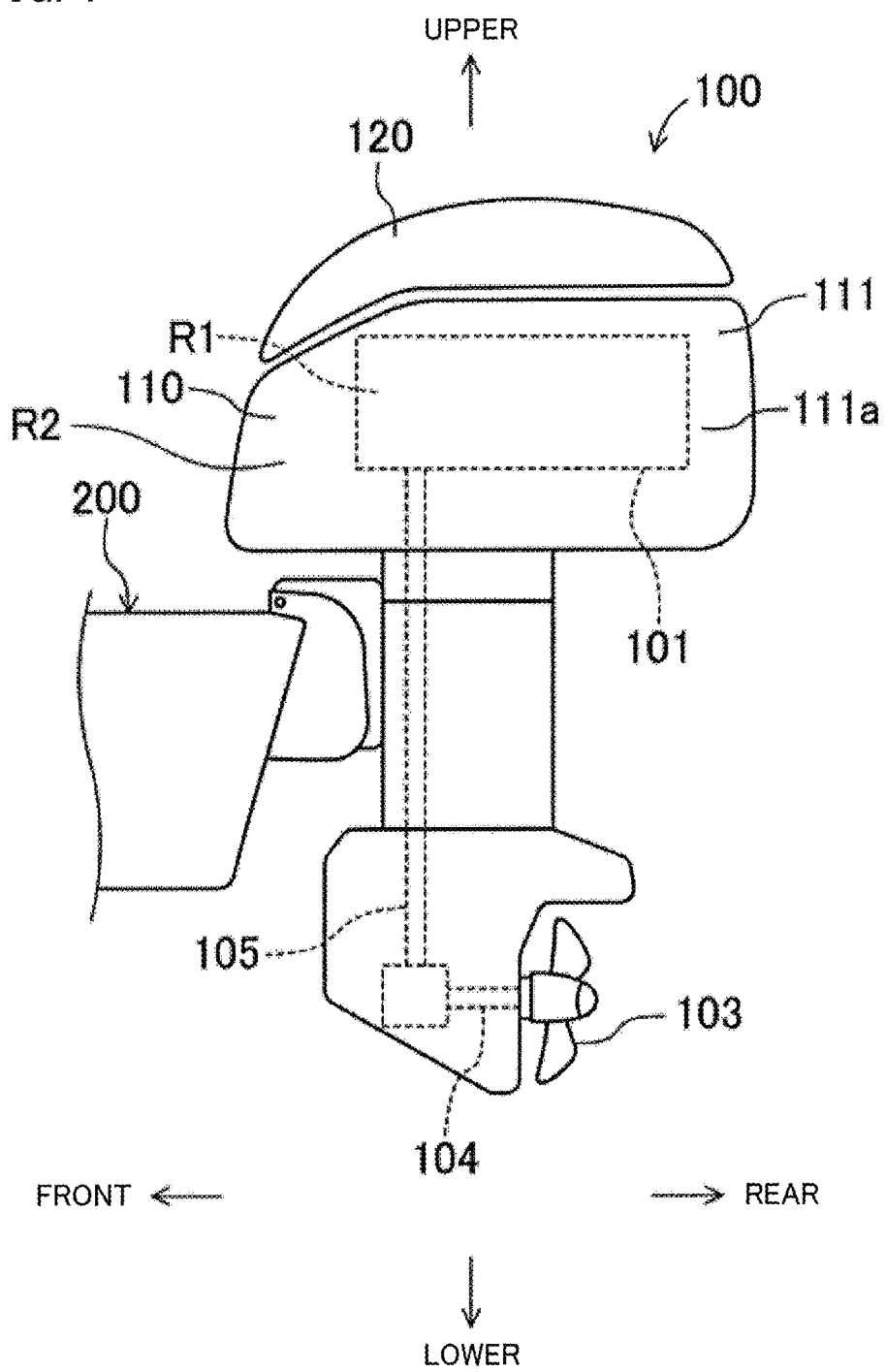
FIG. 1 is a side view showing a rear portion of a vessel to which an outboard motor according to an example embodiment of the present invention has been attached.

FIG. 1 is a side view showing a rear portion of a vessel 200 to which an outboard motor 100 according to an example embodiment of the present invention has been attached. The left side of FIG. 1 is the front side of the outboard motor 100, and the right side of FIG. 1 is the rear side of the outboard motor 100. The upper side of FIG. 1 is the upper side of the outboard motor 100, and the lower side of FIG. 1 is the lower side of the outboard motor 100. An up-down direction is also a vertical direction. A direction perpendicular to the plane of paper of FIG. 1 is a left-right direction of the outboard motor 100. In the following description, the leftward or rightward direction of the outboard motor 100 is determined based on when the outboard motor 100 is seen from the front side. Therefore, the near side in the direction perpendicular to the plane of paper of FIG. 1 is the right side of the outboard motor 100, and the far side in the direction perpendicular to the plane of paper of FIG. 1 is the left side of the outboard motor 100. An engine 101 is housed in an upper portion of the outboard motor 100. On the other hand, in a lower portion of the outboard motor 100, a propeller 103 that generates a thrust is rotatably supported by a propeller shaft 104 that extends in the front-rear direction. Power outputted from the engine 101 is transmitted to a drive shaft 105 that extends in the up-down direction inside the outboard motor 100. The power that has been transmitted to the drive shaft 105 is transmitted to the propeller shaft 104. Thus, the propeller 103 is driven by the engine 101.

Additionally, the outboard motor 100 includes a shroud 140 (see FIG. 6) that covers the engine 101, a cowl 110 that covers the shroud 140 from above, and a cover 120 that covers the upper side of the cowl 110.

Figure 2:
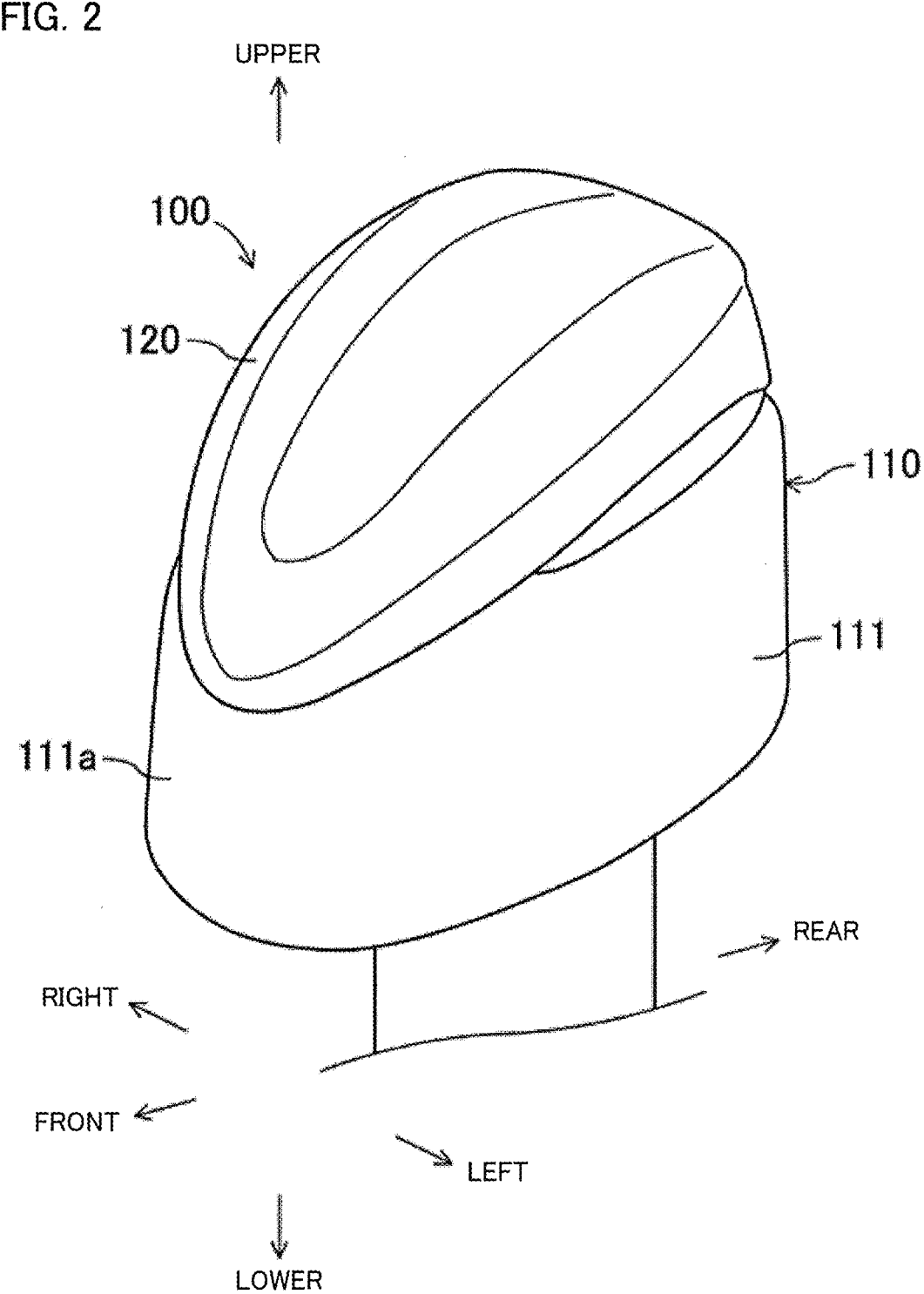
FIG. 2 is a perspective view showing an upper portion of the outboard motor.

A portion, which houses the engine 101, of the outboard motor 100 includes an engine room R1. This engine room R1 is covered by the cowl 110 from above. The cover 120 that covers the cowl 110 from above is detachably attached to an upper portion of the cowl 110 as also shown in FIG. 2.

Figure 3:
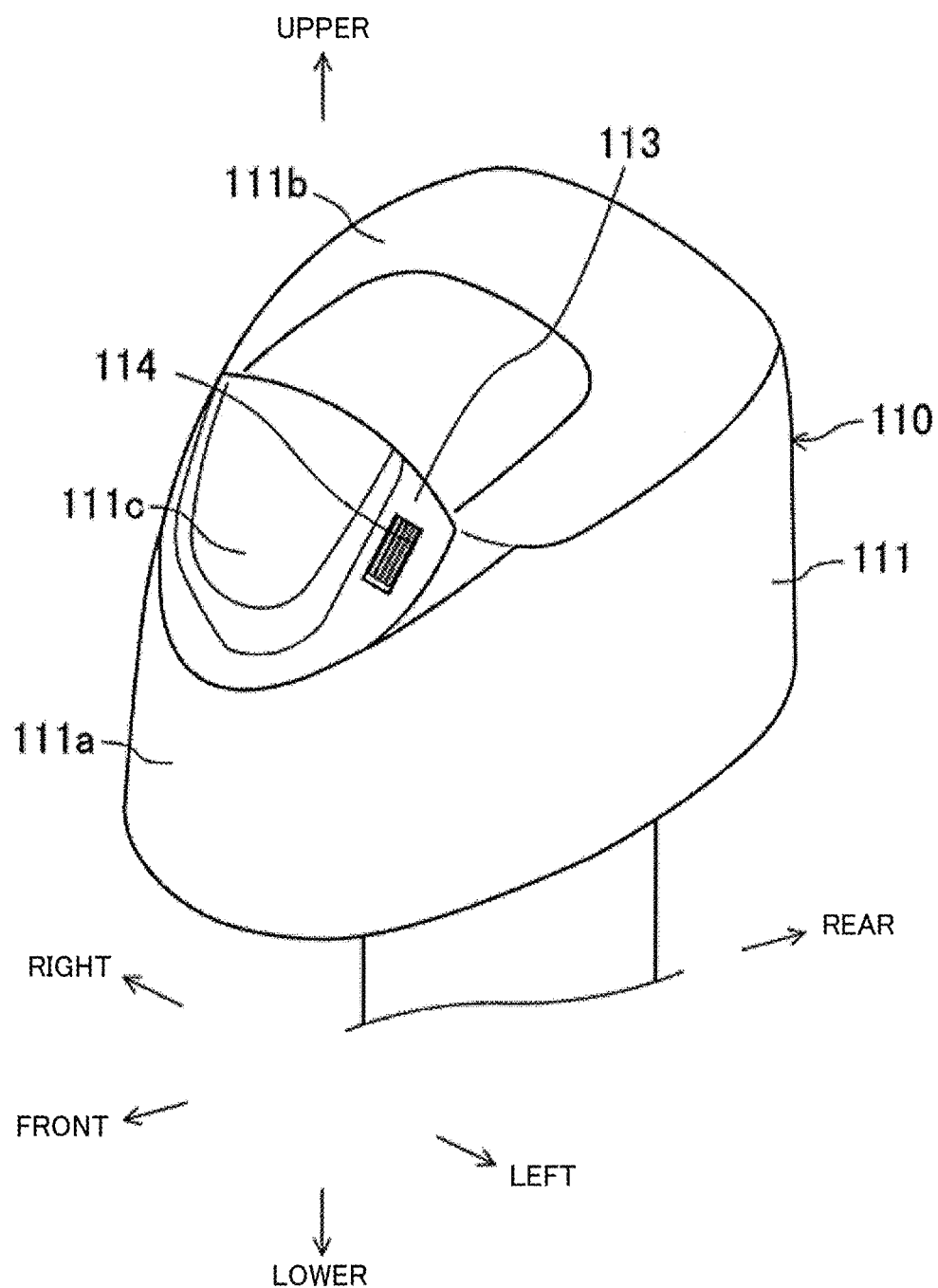
FIG. 3 is a perspective view showing a state in which a cover has been detached.

The cowl 110 is provided with a cowl main body 111 as shown in FIG. 3. The cowl main body 111 is provided with a peripheral wall 111a and an upper wall 111b at an upper portion of the peripheral wall 111a. A front portion of the upper wall 111b is an inclined wall 111c that is forwardly and downwardly inclined such as to be located at a more downward position as it extends toward a front end. On the other hand, a rear portion of the upper wall 111b extends in the front-rear direction and in the left-right direction.

Figure 4:
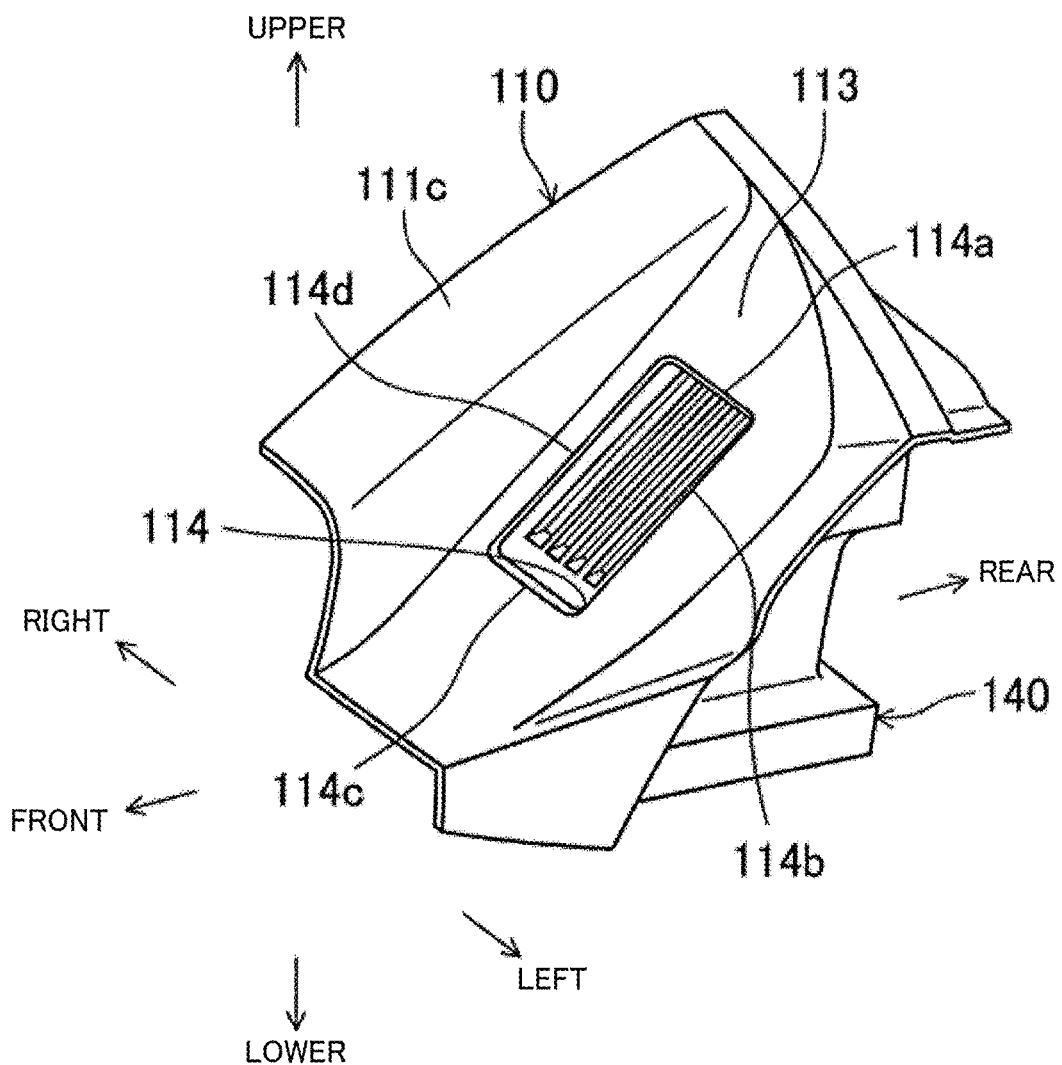
FIG. 4 is a perspective view showing a positional relationship between a cowl and a shroud, and an enlarged view of a cowl opening.

A cowl opening 114 through which heat of the engine 101 is discharged is located in the cowl 110 at a more leftward position than the inclined wall 111c and at a lower position than the inclined wall 111c, as shown in FIG. 4. A size of the cowl opening 114 in the up-down direction is longer than the size in the left-right direction, and has a rectangular shape elongated in the up-down direction. The inclined wall 111c is forwardly and downwardly inclined, and the cowl opening 114 is likewise forwardly and downwardly inclined to be located at a more downward position with increasing proximity to the front end.

The cowl 110 includes a cowl inclined plate 113 extending in the front-rear direction and in the left-right direction on the leftward and downward sides of the inclined wall 111c as shown in FIG. 4. The cowl inclined plate 113 is forwardly and downwardly inclined to be located at a more downward position with increasing proximity to the front end. There is a case in which the inclination angle of the cowl inclined plate 113 is a little larger than the inclination angle of the inclined wall 111c.

The cowl opening 114 having a rectangular shape so as to coincide with a shroud opening 143 (see FIG. 6) is provided in the cowl inclined plate 113. The shroud opening 143 (described below) and the cowl opening 114 are substantially parallel to each other, and communicate with each other. A size of the cowl opening 114 in the up-down direction is longer than its size in the left-right direction, and has a rectangular shape elongated in the up-down direction. The cowl inclined plate 113 is forwardly and downwardly inclined, and therefore the cowl opening 114 and the shroud opening 143 (described later) are each likewise forwardly and downwardly inclined at a more downward position with increasing proximity to the front end.

Figure 5:
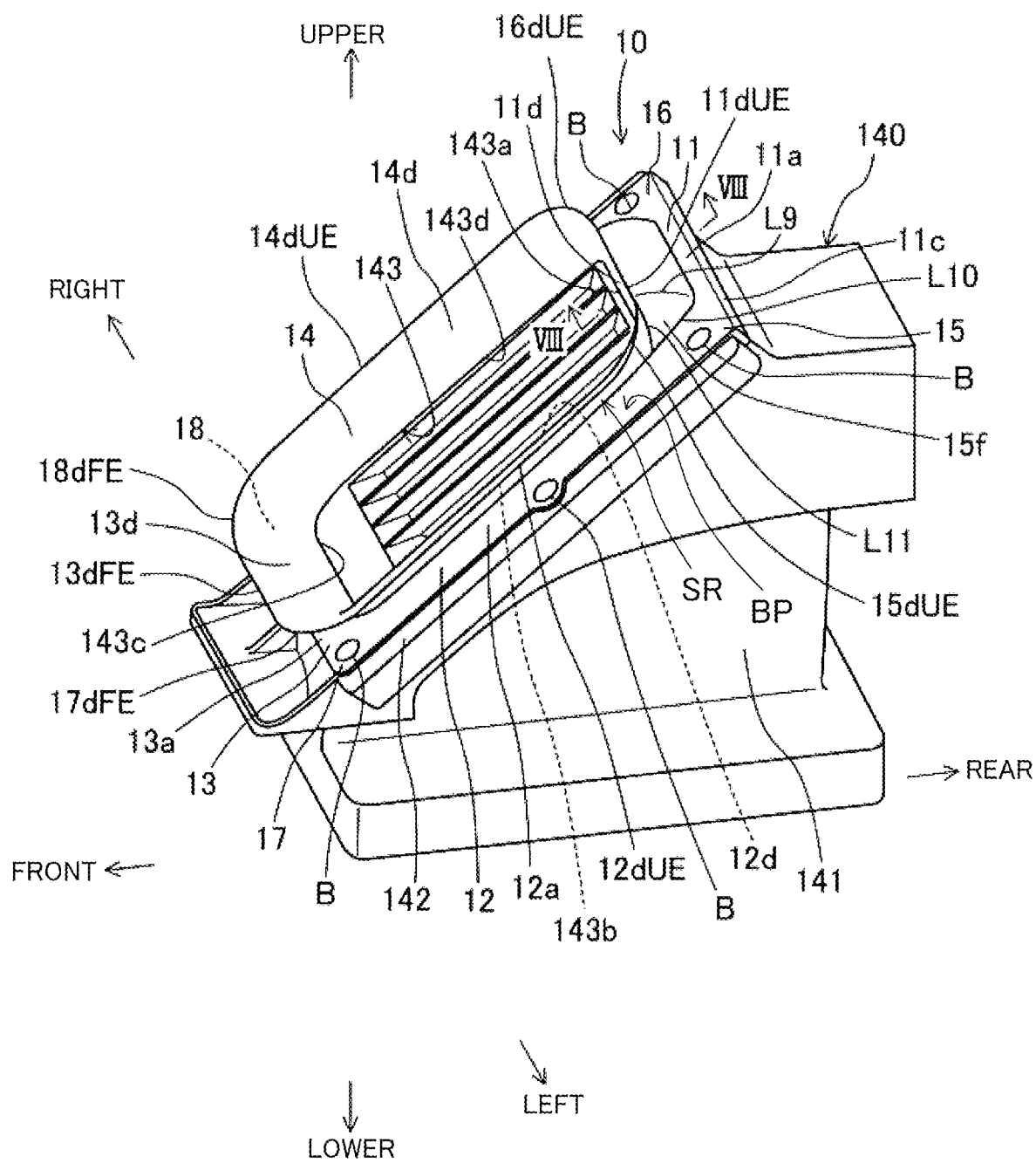
FIG. 5 is a perspective view of the shroud to which a seal has been attached.
Figure 6:
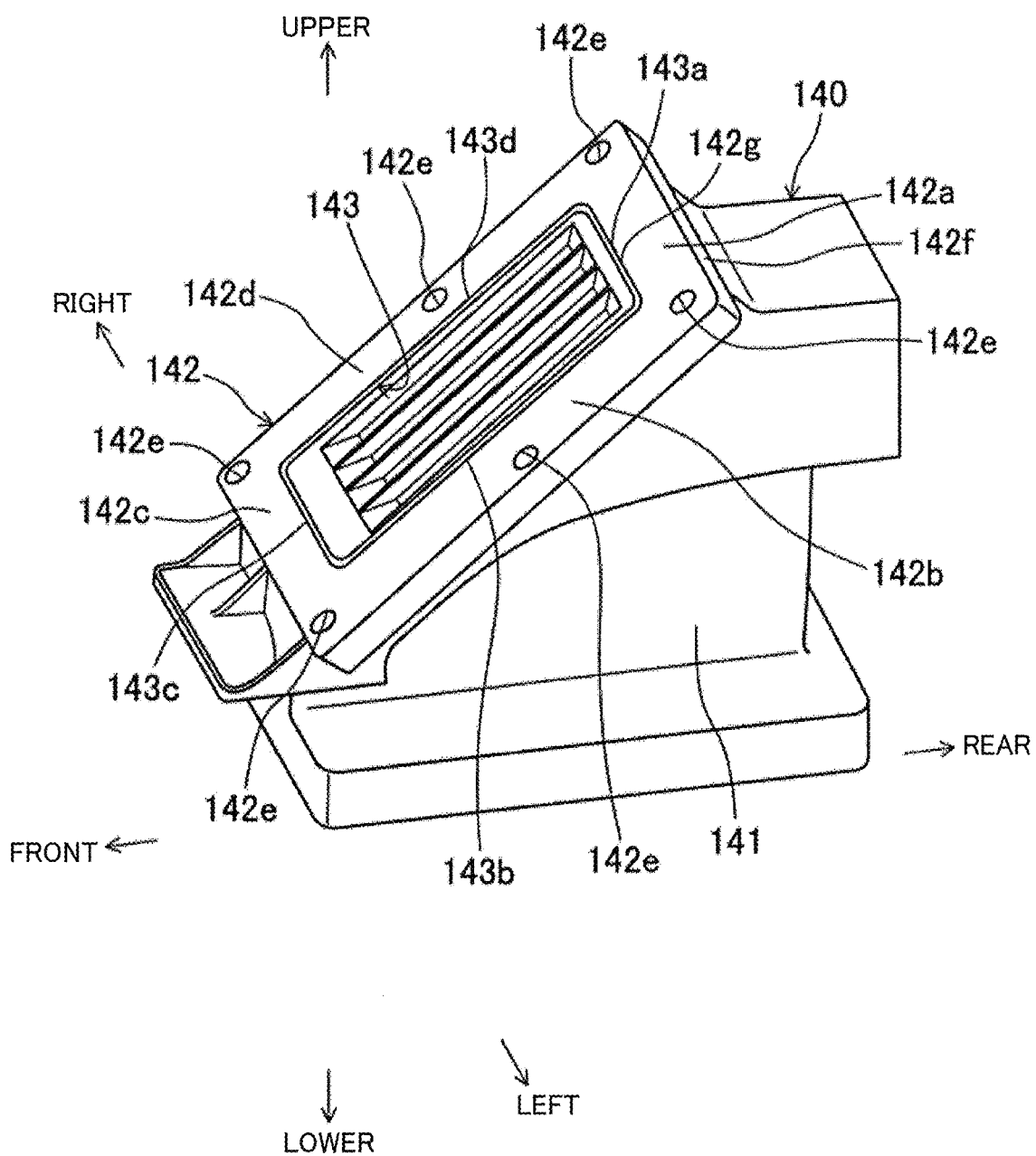
FIG. 6 is a perspective view of the shroud.

The engine 101 housed in the engine room R1 of the outboard motor 100 is covered by the shroud 140 shown in FIGS. 4 to 6 from above. The shroud 140 is covered by the cowl 110 from above.

The shroud 140 is provided with a duct 141 that extends upwardly and through which exhaust heat is discharged and a shroud inclined plate 142. The duct 141 is downwardly open, and hot air of the engine 101 is capable of flowing therethrough. The shroud inclined plate 142 is provided at an upper portion of the duct 141. The shroud inclined plate 142 is spaced apart downwardly from the cowl inclined plate 113. A shroud inclined surface that is an upper surface of the shroud inclined plate 142 and a cowl inclined surface that is a lower surface of the cowl inclined plate 113 face each other in the up-down direction, have substantially the same inclination angle, and are substantially parallel to each other.

The shroud opening 143 is provided in the shroud inclined surface of the shroud inclined plate 142. The cowl opening 114 is provided in a portion, corresponding to the shroud opening 143, of the cowl inclined surface of the cowl 110. The outboard motor 100 includes a seal 10 that seals a space between a peripheral edge of the shroud opening 143 and a peripheral edge of the cowl opening 114. The cowl opening 114 communicates with the shroud opening 143 through an internal space of the seal 10. Therefore, the hot air of the engine 101 upwardly flows inside the duct 141 of the shroud 140, and then passes through the shroud opening 143, and is discharged from the cowl opening 114 to the outside of the cowl 110 (outside of the outboard motor 100).

The seal 10 seals a space between the peripheral edge of the shroud opening 143 and the peripheral edge of the cowl opening 114 such that rainwater or seawater that has entered from a gap between the cover 120 and the cowl 110 does not enter a space R2 between an inner surface of the cowl 110 and an outer surface of the shroud 140 as shown in FIG. 5. The seal 10 is made of an elastic material having rubbery properties. If the material of which the seal 10 is made is, for example, a rubber material, EPDM is applicable, and if the material of which the seal 10 is made is, for example, a thermoplastic resin material, TPO (thermoplastic elastomer olefin) or the like is applicable. Thus, the seal 10 is easily elastically deformed between the peripheral edge of the shroud opening 143 and the peripheral edge of the cowl opening 114, and adhere closely to each member.

The shroud opening 143 has a rectangular shape as shown in FIG. 6, and therefore the peripheral edge of the shroud opening 143 has an upper edge 143a, a left edge 143b, a lower edge 143c, and a right edge 143d. The upper edge 143a and the lower edge 143c extend in the left-right direction, and are parallel to each other. The left edge 143b and the right edge 143d extend in the up-down direction, and are parallel to each other. The length of the upper edge 143a and the length of the lower edge 143c are shorter than the length of the left edge 143b and the length of the right edge 143d.

An upper attachment surface 142a, a left attachment surface 142b, a lower attachment surface 142c, and a right attachment surface 142d are provided around the shroud opening 143 in the upper surface (shroud inclined surface) of the shroud inclined plate 142 as shown in FIG. 6. The upper attachment surface 142a extends in the left-right direction along the upper edge 143a of the shroud opening 143. The left attachment surface 142b extends in the up-down (front-rear) direction along the left edge 143b of the shroud opening 143. The lower attachment surface 142c extends in the left-right direction along the lower edge 143c of the shroud opening 143. The right attachment surface 142d extends in the up-down (front-rear) direction along the right edge 143d of the shroud opening 143. An annular flat surface that surrounds the shroud opening 143 is defined by the upper attachment surface 142a, the left attachment surface 142b, the lower attachment surface 142c, and the right attachment surface 142d.

The seal 10 includes a base plate BP that is fixed to the peripheral edge of the shroud opening 143 and has a rectangular annular shape having a diagonal center line 10c and a rectangular annular seal lip SR that extends from the base plate BP and disposed around the diagonal center line 10c. The outboard motor 100 includes a plurality of fasteners B that fasten the base plate BP to the shroud 140. The base plate BP includes an upper-side attachment plate 11a (first attachment plate), a left-side attachment plate 12a (second attachment plate), a lower-side attachment plate 13a (third attachment plate), and a right-side attachment plate 14a (fourth attachment plate) that are arranged in a rectangular shape.

The rectangular annular seal lip SR elastically comes into contact with the peripheral edge of the cowl opening 114. The rectangular annular seal lip SR includes a hollow upper-side seal lip 11d (first seal lip), a left-side seal lip 12d (second seal lip), a lower-side seal lip 13d (third seal lip), and a right-side seal lip 14d (fourth seal lip). The upper-side seal lip 11d (first seal lip) extends from the upper-side attachment plate 11a (first attachment plate). The left-side seal lip 12d (second seal lip) extends from the left-side attachment plate 12a (second attachment plate). The lower-side seal lip 13d (third seal lip) extends from the lower-side attachment plate 13a (third attachment plate). The right-side seal lip 14d (fourth seal lip) extends from the right-side attachment plate 14a (fourth attachment plate).

Additionally, the seal 10 includes an upper side portion 11 that includes the upper-side attachment plate 11a and the upper-side seal lip 11d. The seal 10 includes a left side portion 12 that includes the left-side attachment plate 12a and the left-side seal lip 12d. The seal 10 includes a lower side portion 13 that includes the lower-side attachment plate 13a and the lower-side seal lip 13d. The seal 10 includes a right side portion 14 that includes the right-side attachment plate 14a and the right-side seal lip 14d. The upper side portion 11 is disposed at a more rearward position and at a more upward position than the lower side portion 13 when seen from the left-right direction.

Additionally, the upper side portion 11 extends along the upper edge 143a of the shroud opening 143 as shown in, for example, FIGS. 5 to 11. The left side portion 12 extends along the left edge 143b of the shroud opening 143. The lower side portion 13 extends along the lower edge 143c of the shroud opening 143. The right side portion 14 extends along the right edge 143d of the shroud opening 143. The seal 10 has a rectangular annular shape including the upper side portion 11, the left side portion 12, the lower side portion 13, and the right side portion 14.

Figure 7:
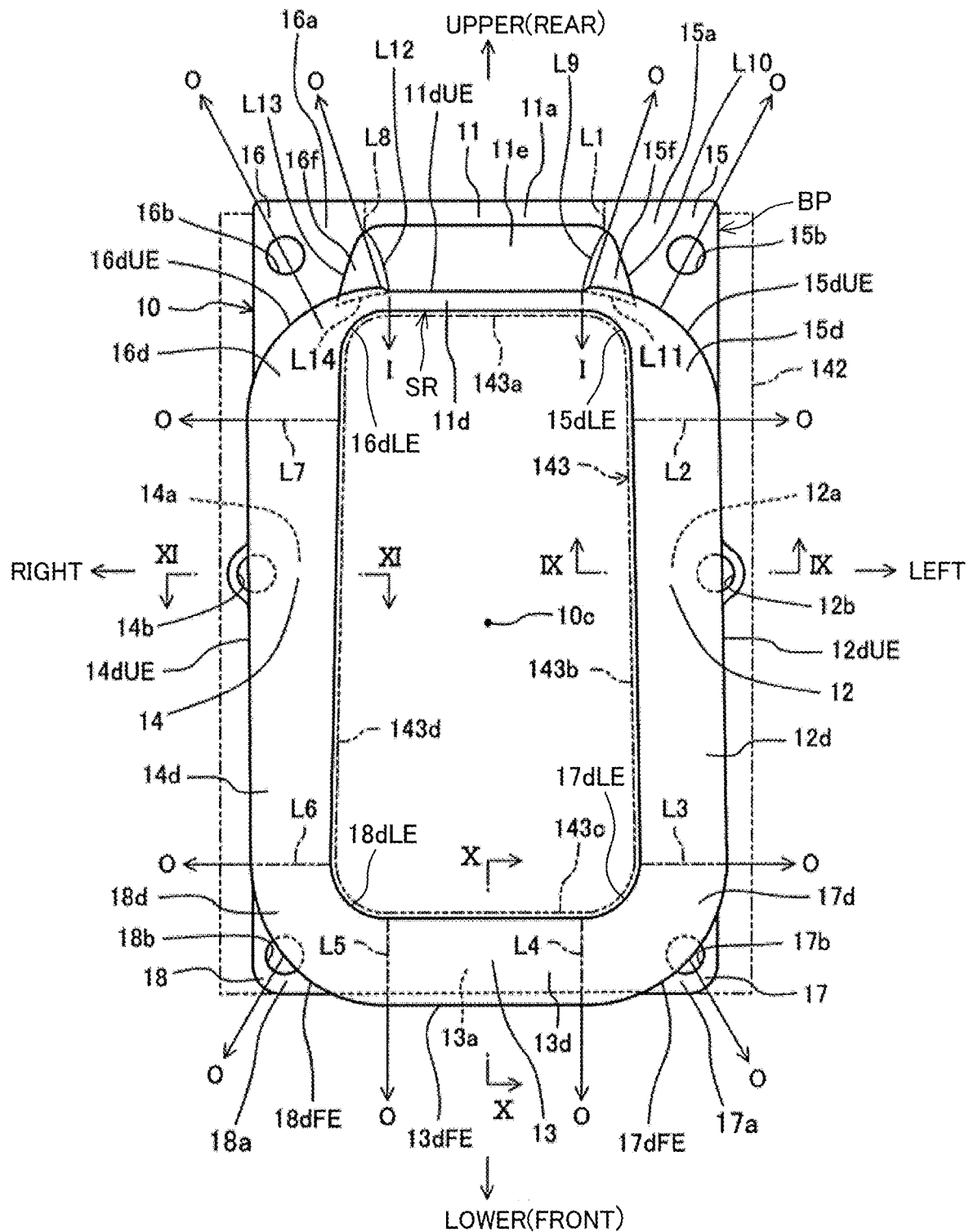
FIG. 7 is a view of the seal seen from a front-end side of a seal lip.

In more detail, the seal 10 includes an upper-left corner portion 15 between the upper side portion 11 and the left side portion 12 an upper-right corner portion 16 between the upper side portion 11 and the right side portion 14 as shown in FIG. 7. Additionally, the seal 10 includes a lower-left corner portion 17 between the lower side portion 13 and the left side portion 12 and a lower-right corner portion 18 between the lower side portion 13 and the right side portion 14. The seal 10 has a rectangular annular shape by consecutively arranging the upper side portion 11, the upper-left corner portion 15, the left side portion 12, the lower-left corner portion 17, the lower side portion 13, the lower-right corner portion 18, the right side portion 14, and the upper-right corner portion 16 in order.

Figure 8:
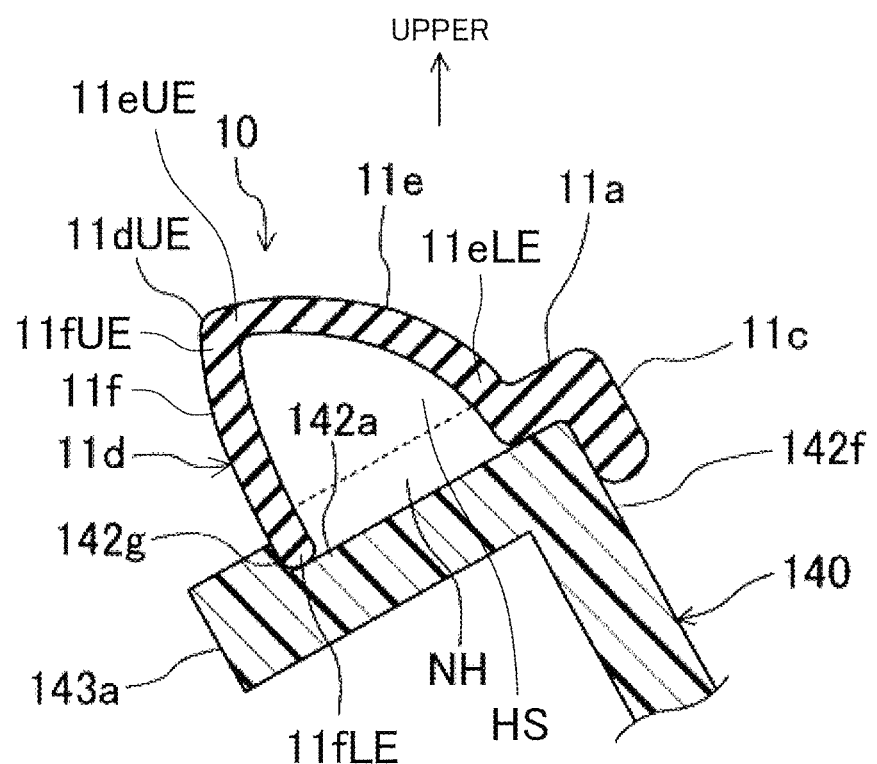
FIG. 8 is a cross-sectional view along line VIII-VIII in FIG. 5.

An extension line L1 and an extension line L8 are extension lines of a left end and a right end, respectively, of a first base end 11eLE of the first lip portion 11e of the upper-side seal lip 11d (see FIG. 8). Additionally, a boundary line L2 is a boundary line between an upper end of the left side portion 12 and a lower end of the upper-left corner portion 15, and a boundary line L3 is a boundary line between a lower end of the left side portion 12 and an upper end of the lower-left corner portion 17. Additionally, a boundary line L4 is a boundary line between a left end of the lower side portion 13 and a right end of the lower-left corner portion 17, and a boundary line L5 is a boundary line between a right end of the lower side portion 13 and a left end of the lower-right corner portion 18. Additionally, a boundary line L6 is a boundary line between a lower end of the right side portion 14 and an upper end of the lower-right corner portion 18, and a boundary line L7 is a boundary line between an upper end of the right side portion 14 and a lower end of the upper-right corner portion 16.

The upper side portion 11, the upper-left corner portion 15, the left side portion 12, the lower-left corner portion 17, the lower side portion 13, the lower-right corner portion 18, the right side portion 14, and the upper-right corner portion 16 are molded integrally with each other. The upper-side attachment plate 11a, the left-side attachment plate 12a, the lower-side attachment plate 13a, and the right-side attachment plate 14a are attached to the upper attachment surface 142a, the left attachment surface 142b, the lower attachment surface 142c, and the right attachment surface 142d, respectively, that are provided around the shroud opening 143.

The upper-side attachment plate 11a extends in the left-right direction along the upper attachment surface 142a, such that its lower surface adheres closely to the upper attachment surface 142a. The left-side attachment plate 12a extends in the up-down (front-rear) direction along the left attachment surface 142b, such that its lower surface adheres closely to the left attachment surface 142b. The lower-side attachment plate 13a extends in the left-right direction along the lower attachment surface 142c, such that its lower surface adheres closely to the lower attachment surface 142c. The right-side attachment plate 14a extends in the up-down (front-rear) direction along the right attachment surface 142d, such that its lower surface adheres closely to the right attachment surface 142d.

The upper-side attachment plate 11a, the left-side attachment plate 12a, the lower-side attachment plate 13a, and the right-side attachment plate 14a are located within an annular same plane. In detail, the lower surface of the upper-side attachment plate 11a, the lower surface of the left-side attachment plate 12a, the lower surface of the lower-side attachment plate 13a, and the lower surface of the right-side attachment plate 14a are located on the annular same plane defined by the upper attachment surface 142a, the left attachment surface 142b, the lower attachment surface 142c, and the right attachment surface 142d that are provided around the shroud opening 143 shown in FIG. 6. As a result, the upper-side attachment plate 11a, the left-side attachment plate 12a, the lower-side attachment plate 13a, and the right-side attachment plate 14a are arranged such as to surround the shroud opening 143 in a state in which the seal 10 has been attached to the shroud inclined plate 142.

Additionally, in more detail, from the foregoing description, the upper-side attachment plate 11a, the upper-left attachment plate 15a, the left-side attachment plate 12a, the lower-left attachment plate 17a, the lower-side attachment plate 13a, the lower-right attachment plate 18a, the right-side attachment plate 14a, and the upper-right attachment plate 16a are likewise located such as to define an annular same plane and to be consecutively arranged in order as shown in FIG. 7. The upper-side attachment plate 11a, the upper-left attachment plate 15a, the left-side attachment plate 12a, the lower-left attachment plate 17a, the lower-side attachment plate 13a, the lower-right attachment plate 18a, the right-side attachment plate 14a, and the upper-right attachment plate 16a are located on a same plane defined by the peripheral edge of the shroud opening 143 as shown in FIG. 6. This same plane is a flat surface including the upper attachment surface 142a, the left attachment surface 142b, the lower attachment surface 142c, and the right attachment surface 142d. As a result, the upper-side attachment plate 11a, the upper-left attachment plate 15a, the left-side attachment plate 12a, the lower-left attachment plate 17a, the lower-side attachment plate 13a, the lower-right attachment plate 18a, the right-side attachment plate 14a, and the upper-right attachment plate 16a are arranged to surround the shroud opening 143 in a state in which the seal 10 has been attached to the shroud inclined plate 142.

Additionally, a left through-hole 12b into which a fastener B (shown in FIG. 5) to fasten the left-side attachment plate 12a to the shroud 140 is inserted is provided in the left-side attachment plate 12a as shown in FIG. 7. The left through-hole 12b passes through the left-side attachment plate 12a in a thickness direction.

Additionally, a right through-hole 14b into which the fastener B to fasten the right-side attachment plate 14a to the shroud 140 is inserted is provided in the right-side attachment plate 14a in the same way as on the left side.

Additionally, an upper-left through-hole 15b, an upper-right through-hole 16b, a lower-left through-hole 17b, and a lower-right through-hole 18b into each of which the fastener B is inserted are provided in the upper-left corner portion 15, the upper-right corner portion 16, the lower-left corner portion 17, and the lower-right corner portion 18, respectively. The fastener B is, for example, a vis, a screw, a clip, or the like.

Six screw holes 142e are provided in the shroud inclined plate 142 so as to correspond to the left through-hole 12b, the right through-hole 14b, the upper-left through-hole 15b, the upper-right through-hole 16b, the lower-left through-hole 17b, and the lower-right through-hole 18b of the seal 10 as shown in FIG. 6. The fastener B is inserted into the left through-hole 12b, the right through-hole 14b, the upper-left through-hole 15b, the upper-right through-hole 16b, the lower-left through-hole 17b, and the lower-right through-hole 18b of the seal 10, and is then screwed into a screw hole 142e, thus making it possible to fasten and fix the seal 10 to the shroud inclined plate 142. It should be noted that the upper-side attachment plate 11a, the left-side attachment plate 12a, the lower-side attachment plate 13a, and the right-side attachment plate 14a may be fixed to the shroud inclined plate 142 by, for example, a double-sided tape or the like.

A lock portion 11c that downwardly protrudes and extends in the left-right direction is provided at an upper (rear) edge portion of the upper-side attachment plate 11a as also shown in FIG. 5 and FIG. 8. On the other hand, the shroud 140 includes a lock surface 142f that intersects the upper attachment surface 142a. The lock surface 142f is a lengthwise diagonal surface intersecting an upper edge of the upper attachment surface 142a. The lock portion 11c is locked on the lock surface 142f in a state in which the base plate BP of the seal 10 has been attached to the shroud inclined plate 142. In more detail, an L-shaped part including the upper-side attachment plate 11a and the lock portion 11c is locked by an L-shaped part including the upper attachment surface 142a and the lock surface 142f.

Figure 9:
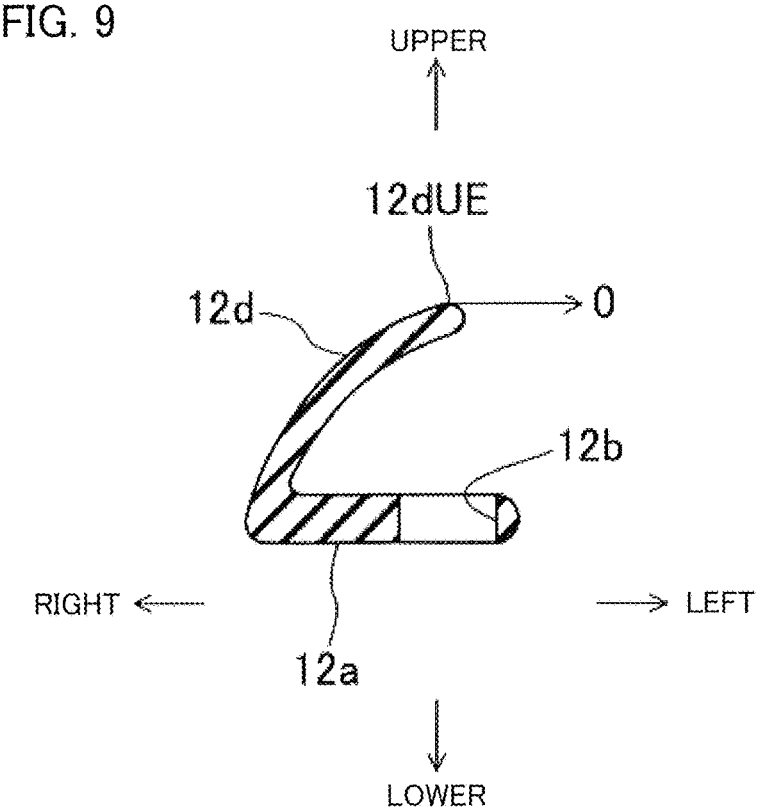
FIG. 9 is a cross-sectional view along line IX-IX in FIG. 7.

Additionally, the left-side seal lip 12d that protrudes upwardly and is curved to be at a more leftward position as it extends toward the front end is provided at a right end of the left-side attachment plate 12a as shown in FIG. 7 and FIG. 9. The left-side seal lip 12d extends while curving leftwardly, and therefore the left-side seal lip 12d faces a left edge 114b of the cowl opening 114 as shown in FIG. 4 and FIG. 5. When the cowl 110 is attached, at least a front end 12dUE (upper end) of the left-side seal lip 12d elastically comes into contact with the left edge 114b of the cowl opening 114 and its vicinity.

Figure 10:
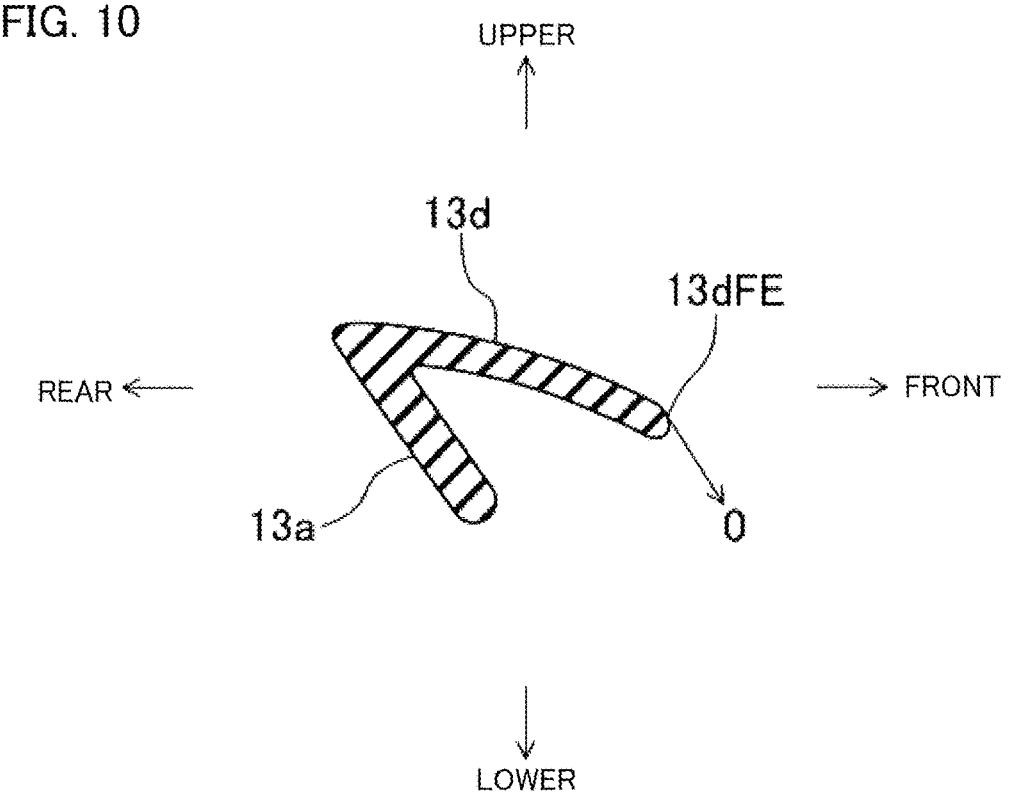
FIG. 10 is a cross-sectional view along line X-X in FIG. 7.

Additionally, the lower-side seal lip 13d that protrudes forwardly and is curved to be at a more forward position with increasing proximity to the front end is provided at an upper end of the lower-side attachment plate 13a as shown in FIG. 7 and FIG. 10. The lower-side seal lip 13d extends while curving forwardly, and therefore the lower-side seal lip 13d faces a lower edge 114c of the cowl opening 114 as shown in FIG. 4 and FIG. 5. When the cowl 110 is attached, at least a front end 13dFE (forward end) of the lower-side seal lip 13d elastically comes into contact with the lower edge 114c of the cowl opening 114 and its vicinity.

Figure 11:
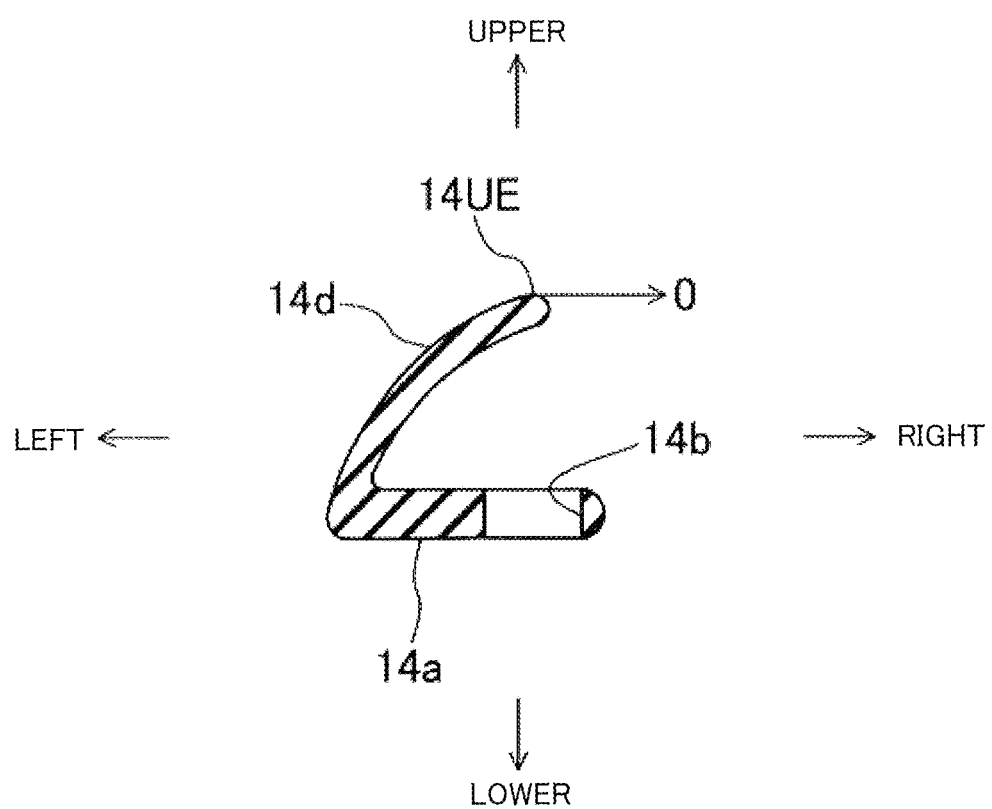
FIG. 11 is a cross-sectional view along line XI-XI in FIG. 7.

Additionally, the right-side seal lip 14d that protrudes upwardly and is curved to be at a more rightward position with increasing proximity to the front end is provided at a left end of the right-side attachment plate 14a as shown in FIG. 7 and FIG. 11. The right-side seal lip 14d extends while curving rightwardly, and therefore the right-side seal lip 14d faces a right edge 114d of the cowl opening 114 as shown in FIG. 4 and FIG. 5. When the cowl 110 is attached, at least a front end 14dUE (upper end) of the right-side seal lip 14d elastically comes into contact with the right edge 114d of the cowl opening 114 and its vicinity.

Additionally, the upper-side seal lip 11d (first seal lip) includes the first lip portion 11e, a second lip portion 11f, and a hollow portion HS between the first lip portion 11e and the second lip portion 11f as shown in FIG. 8. The first lip portion 11e includes the first base end 11eLE (lower end) connected to the upper-side attachment plate 11a (first attachment plate) and a first front end 11eUE (upper end). The second lip portion 11f includes a second base end 11fLE (lower end) and a second front end 11fUE (upper end). The second base end 11fLE of the second lip portion 11f is located closer to the diagonal center line 10c (see FIG. 7) than the first lip portion 11e, and is supported by the peripheral edge of the shroud opening 143. The second front end 11fUE of the second lip portion 11f is connected to the first front end 11eUE of the first lip portion 11e. The first lip portion 11e and the second lip portion 11f have a chevron shape in cross-section that are inclined in mutually opposite directions in a free state. A top portion 11dUE of the upper-side seal lip 11d (first seal lip) being in a free state is defined by the first front end 11eUE of the first lip portion 11e and the second front end 11fUE of the second lip portion 11f that are connected together.

In a state in which the cowl 110 has been attached as shown in FIG. 9, the first lip portion 11e additionally includes a surface contact region PCA that extends to the first front end 11eUE from a halfway portion between the first base end 11eLE and the first front end 11eUE and that elastically comes into surface contact with the peripheral edge of the cowl opening 114. The first lip portion 11e and the second lip portion 11f are bent and deformed such that the hollow portion HS has a rectangular shape in cross-section.

Additionally, the upper-side attachment plate 11a is directly connected to the first base end 11eLE of the first lip portion 11e of the upper-side seal lip 11d as shown in FIG. 8. The upper-side attachment plate 11a is not directly connected to the second base end 11fLE of the second lip portion 11f of the upper-side seal lip 11d. The second base end 11fLE of the second lip portion 11f is separated from the upper-side attachment plate 11a.

The first lip portion 11e protrudes toward an upper edge 114a of the cowl opening 114 from the lower end (front end) of the upper-side attachment plate 11a. The second lip portion 11f protrudes toward the upper edge 114a of the cowl opening 114 from the second base end 11fLE that is in contact with and supported by the upper attachment surface 142a of the peripheral edge of the shroud opening 143, and the second lip portion 11f extends to the second front end 11fUE.

The distance between the first lip portion 11e and the second lip portion 11f that have a chevron shape in cross-section in a free state becomes wider with increasing proximity to the upper attachment surface 142a. The second base end 11fLE of the second lip portion 11f orthogonally presses the shroud inclined surface, and is in contact with the shroud inclined surface. In detail, the second base end 11fLE of the second lip portion 11f is brought into contact with and orthogonally presses the upper attachment surface 142a provided around the shroud opening 143.

The upper attachment surface 142a includes a step 142g that locks the second base end 11fLE of the second lip portion 11f of the upper-side seal lip 11d. In a state in which the base plate BP of the seal 10 has been attached to the shroud inclined plate 142, the second base end 11fLE of the second lip portion 11f of the upper-side seal lip 11d comes into contact with the step 142g from above (from behind) and is locked.

Figure 12:
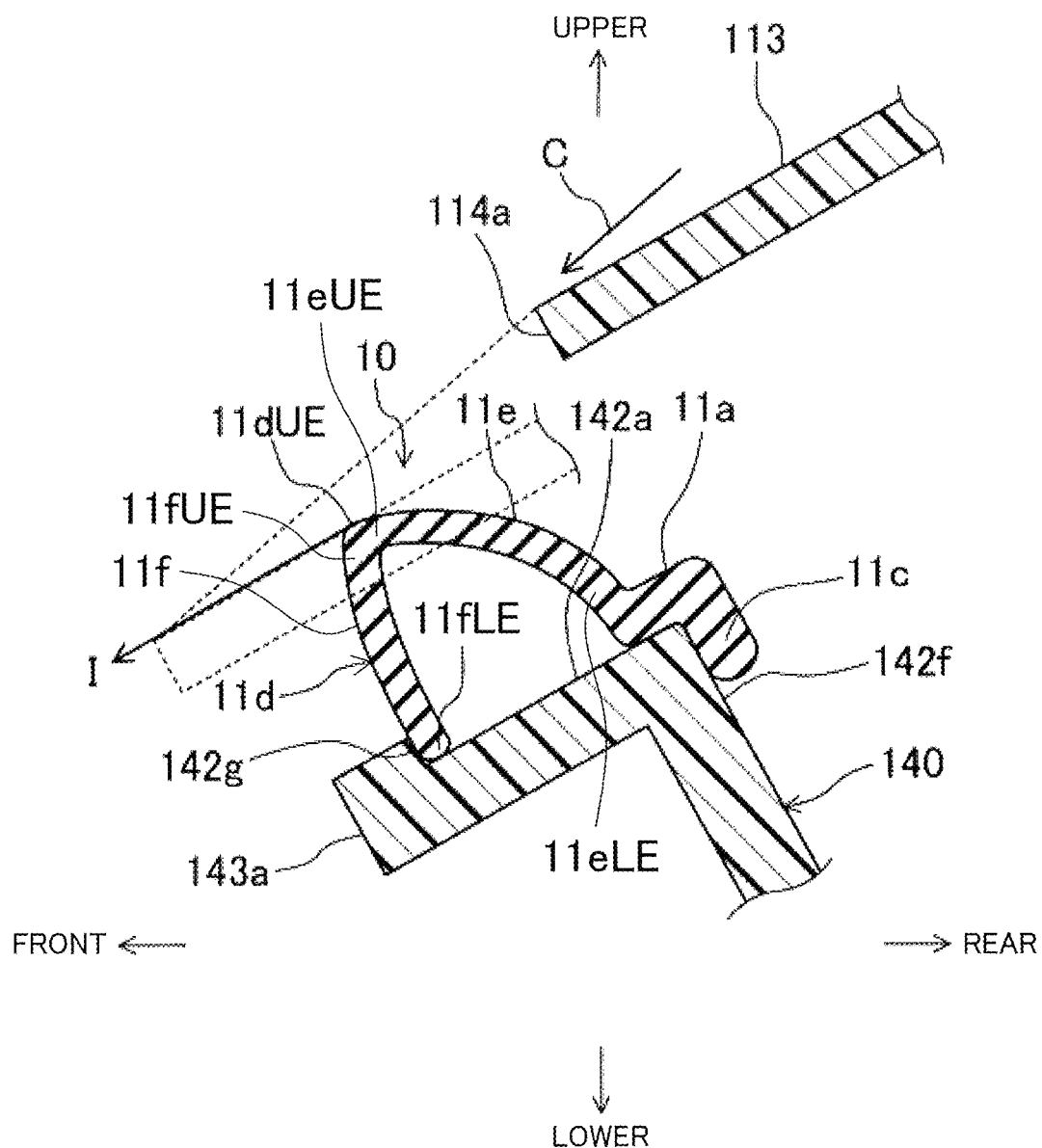
FIG. 12 is a view showing a positional relationship between the cowl and the seal that have not yet been attached, and which corresponds to FIG. 8.

Additionally, the surface contact region PCA of the first lip portion 11e of the upper-side seal lip 11d, the front end 12dUE of the left-side seal lip 12d (upper end, see FIG. 9), the front end 13dFE of the lower-side seal lip 13d (front end, see FIG. 10), and the front end 14dUE of the right-side seal lip 14d (upper end, see FIG. 11) are located on a same plane defined by the peripheral edge of the cowl opening 114 as shown in FIG. 7 and FIG. 12.

Additionally, the peripheral edge including the upper edge 114a, the left edge 114b, the lower edge 114c, and the right edge 114d that are provided around the cowl opening 114 define an annular plane as shown in FIG. 4. In other words, when the cowl 110 is attached, the surface contact region PCA of the first lip portion 11e of the upper-side seal lip 11d (see FIG. 13), the front end 12dUE of the left-side seal lip 12d (upper end, see FIG. 9), the front end 13dFE of the lower-side seal lip 13d (front end, see FIG. 10), and the front end 14dUE of the right-side seal lip 14d (upper end, see FIG. 11) are located on the plane defined by the peripheral edge of the cowl opening 114.

Additionally, the rectangular annular seal lip SR includes an upper-left seal lip 15d between the upper-side seal lip 11d and the left-side seal lip 12d and an upper-right seal lip 16d between the upper-side seal lip 11d and the right-side seal lip 14d as shown in FIG. 7. Additionally, the rectangular annular seal lip SR includes a lower-left seal lip 17d between the lower-side seal lip 13d and the left-side seal lip 12d and a lower-right seal lip 18d between the lower-side seal lip 13d and the right-side seal lip 14d. Additionally, the base plate BP includes the upper-left attachment plate 15a between the upper-side attachment plate 11a and the left-side attachment plate 12a and the upper-right attachment plate 16a between the upper-side attachment plate 11a and the right-side attachment plate 14a. Additionally, the base plate BP includes the lower-left attachment plate 17a between the lower-side attachment plate 13a and the left-side attachment plate 12a and the lower-right attachment plate 18a between the lower-side attachment plate 13a and the right-side attachment plate 14a. The upper-left seal lip 15d, the upper-right seal lip 16d, the lower-left seal lip 17d, and the lower-right seal lip 18d protrude toward the cowl opening 114, respectively.

The upper-left seal lip 15d includes a base end 15dLE that is located on the upper-left attachment plate 15a and has an "r" shape (i.e., a curved or rounded shape) and a front end 15dUE. The upper-left seal lip 15d has a curved shape that extends away from the diagonal center line 10c with increasing proximity to the front end 15dUE from the base end 15dLE. The upper-right seal lip 16d includes a base end 16dLE that is located on the upper-right attachment plate 16a and that has an r shape and a front end 16dUE. The upper-right seal lip 16d has a curved shape that the extends away from the diagonal center line 10c with increasing proximity to the front end 16dUE from the base end 16dLE.

The lower-left seal lip 17d includes a base end 17dLE that is located on the lower-left attachment plate 17a and has an r shape and a front end 17dUE. The lower-left seal lip 17d has a curved shape that extends away from the diagonal center line 10c with increasing proximity to the front end 17dUE from the base end 17dLE. The lower-right seal lip 18d includes a base end 18dLE that is located on the lower-right attachment plate 18a and has an r shape and a front end 18dUE. The lower-right seal lip 18d has a curved shape increasingly deviating from the diagonal center line 10c with increasing proximity to the front end 18dUE from the base end 18dLE.

The base end 15dLE of the upper-left seal lip 15d has an r shape that connects a linear first base end 11eLE of the first lip portion 11e of the upper-side seal lip 11d and a linear base end 12dLE of the left-side seal lip 12d together. The base end 16dLE of the upper-right seal lip 16d has an r shape that connects the linear first base end 11eLE of the first lip portion 11e of the upper-side seal lip 11d and a linear base end 14dLE of the right-side seal lip 14d together. The base end 17dLE of the lower-left seal lip 17d has an r shape that connects a linear base end 13dLE of the lower-side seal lip 13d and the linear base end 12dLE of the left-side seal lip 12d together. The base end 18dLE of the lower-right seal lip 18d has an r shape that connects the linear base end 13dLE of the lower-side seal lip 13d and the base end 14dLE of the right-side seal lip 14d together. The front end 17dUE of the lower-left seal lip 17d has an r shape that is substantially concentric with the r shape of the base end 17dLE. The front end 18dUE of the lower-right seal lip 18d has an r shape that is substantially concentric with the r shape of the base end.

Figure 14:
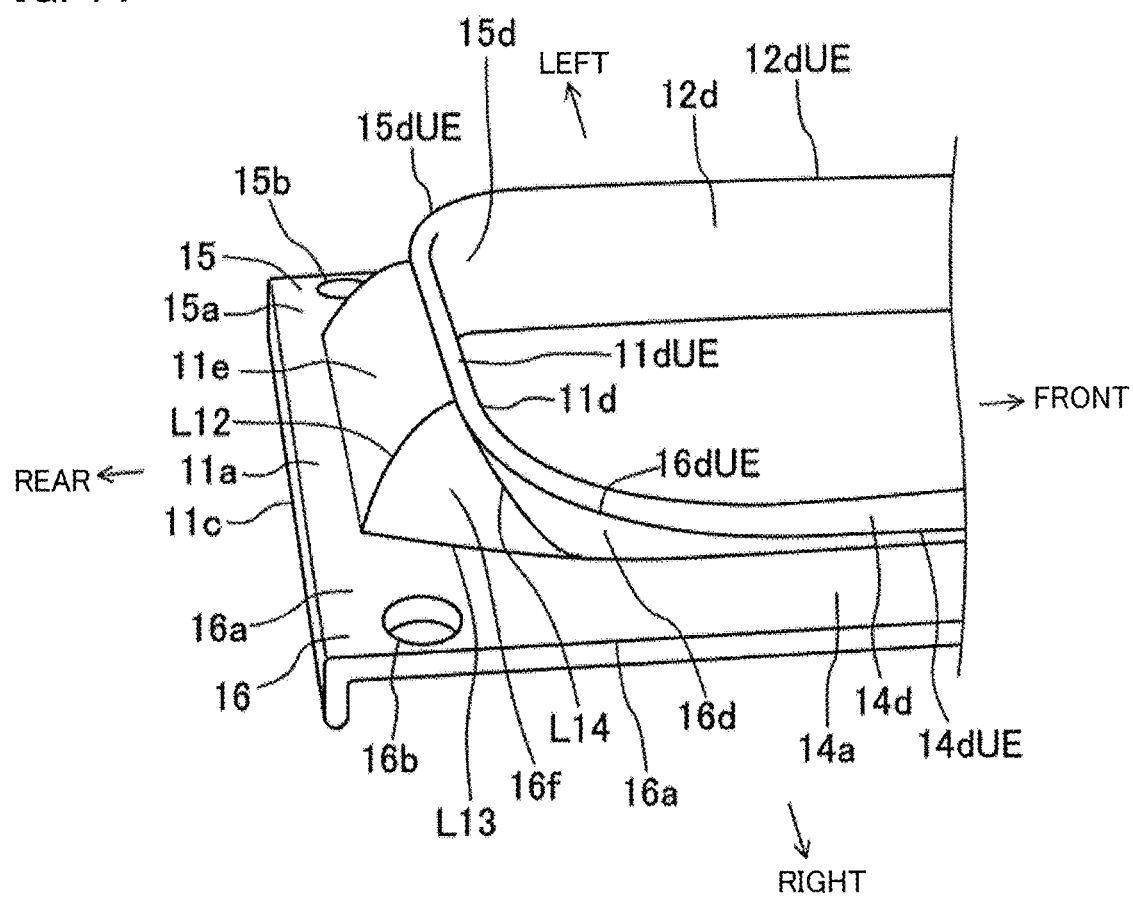
FIG. 14 is a perspective view of a rear portion of the seal.

Additionally, the seal 10 includes a triangular upper-left lid portion 15f that seals the inside of a triangle whose three sides are the left end of the first lip portion 11e, the rear end of the upper-left seal lip 15d, and the right end of the upper-left attachment plate 15a as shown in FIG. 5 and FIG. 14. Additionally, the seal 10 includes a triangular upper-right lid portion 16f that seals the inside of a triangle whose three sides are the right end of the first lip portion 11e, the rear end of the upper-right seal lip 16d, and the left end of the upper-right attachment plate 16a. As has been described with reference to FIG. 8, the upper-side attachment plate 11a is not directly connected to the second base end 11fLE of the second lip portion 11f of the upper-side seal lip 11d (first seal lip). The second base end 11fLE of the second lip portion 11f is separated from the upper-side attachment plate 11a. The upper-side attachment plate 11a includes a die-cut hole NH that communicates with the hollow portion HS of the upper-side seal lip 11d. An inner surface of the upper-left lid portion 15f and an inner surface of the upper-right lid portion 16f face the die-cut hole NH through the hollow portion HS.

Additionally, a boundary line L9 between the left end of the first lip portion 11e and the upper-left lid portion 15f is located at a more leftward position extending rearwardly as shown in FIG. 5 and FIG. 14. A boundary line L10 between the upper-left lid portion 15f and the upper-left attachment plate 15a is located at a more leftward position extending forwardly. A boundary line L12 between the right end of the first lip portion 11e and the upper-right lid portion 16f is located at a more rightward position extending rearwardly. A boundary line L13 between the upper-right lid portion 16f and the upper-right attachment plate 16a is located at a more rightward position extending forwardly.

Additionally, as has been described with reference to FIG. 7, FIG. 9 and FIG. 11, the through-holes 12b and 14b into each of which the fastener B to fasten the attachment plates to the shroud 140 is inserted are provided in the left-side attachment plate 12a and the right-side attachment plate 14a, respectively.

Still additionally, the through-holes 15b, 16b, 17b, and 18b into each of which the fastener B is inserted may also be provided in the upper-left attachment plate 15a, the upper-right attachment plate 16a, the lower-left attachment plate 17a, and the lower-right attachment plate 18a, respectively.

According to the above example embodiments, as described with reference to FIG. 5 and FIG. 7, the upper-side attachment plate 11a, the left-side attachment plate 12a, the lower-side attachment plate 13a, and the right-side attachment plate 14a of the base plate BP of the seal 10 are attached to the upper attachment surface 142a, the left attachment surface 142b, the lower attachment surface 142c, and the right attachment surface 142d, respectively, that have been provided around the shroud opening 143. The shroud opening 143 is provided in the shroud inclined plate 142, and therefore the upper-side seal lip 11d, the left-side seal lip 12d, the lower-side seal lip 13d, and the right-side seal lip 14d are located such that each lip takes an inclined attitude.

When the cowl 110 is attached in this state, the cowl 110 is located above the shroud 140, and is then moved in the direction of an arrow C as shown in FIG. 12. At this time, as described with reference to FIG. 5 to FIG. 7, the upper-side seal lip 11d, the left-side seal lip 12d, the lower-side seal lip 13d, and the right-side seal lip 14d are inclined in mutually different directions. The moving direction of the cowl 110 differs from the directions in which the upper-side seal lip 11d, the left-side seal lip 12d, the lower-side seal lip 13d, and the right-side seal lip 14d extend.

In detail, if attention is focused on the cowl inclined plate 113 of an inside member 112, the seal 10 is fixed to the shroud 140 when the cowl 110 is attached as shown in FIG. 12, and therefore the cowl inclined plate 113 is moved relatively with respect to the seal 10 in the direction of the arrow C.

The left-side seal lip 12d and the right-side seal lip 14d of the seal 10 protrude while curving leftwardly and rightwardly, respectively. Therefore, even if the cowl inclined plate 113 moving in the direction of the arrow C is slidably brought into contact with the left-side seal lip 12d and with the right-side seal lip 14d, the left-side seal lip 12d and the right-side seal lip 14d will be bent and deformed leftwardly and rightwardly (i.e., in directions of an arrow O that are directions receding from the center), respectively. Disadvantageous deformation, such as turn-up, does not occur.

Additionally, the lower-side seal lip 13d protrudes while curving forwardly, and therefore even if the cowl inclined plate 113 moving in the direction of the arrow C is slidably brought into contact with the lower-side seal lip 13d, the lower-side seal lip 13d will be bent and deformed forwardly (i.e., in the direction of the arrow O that a direction receding from the center). Therefore, disadvantageous deformation, such as turn-up, does not occur.

Figure 13:
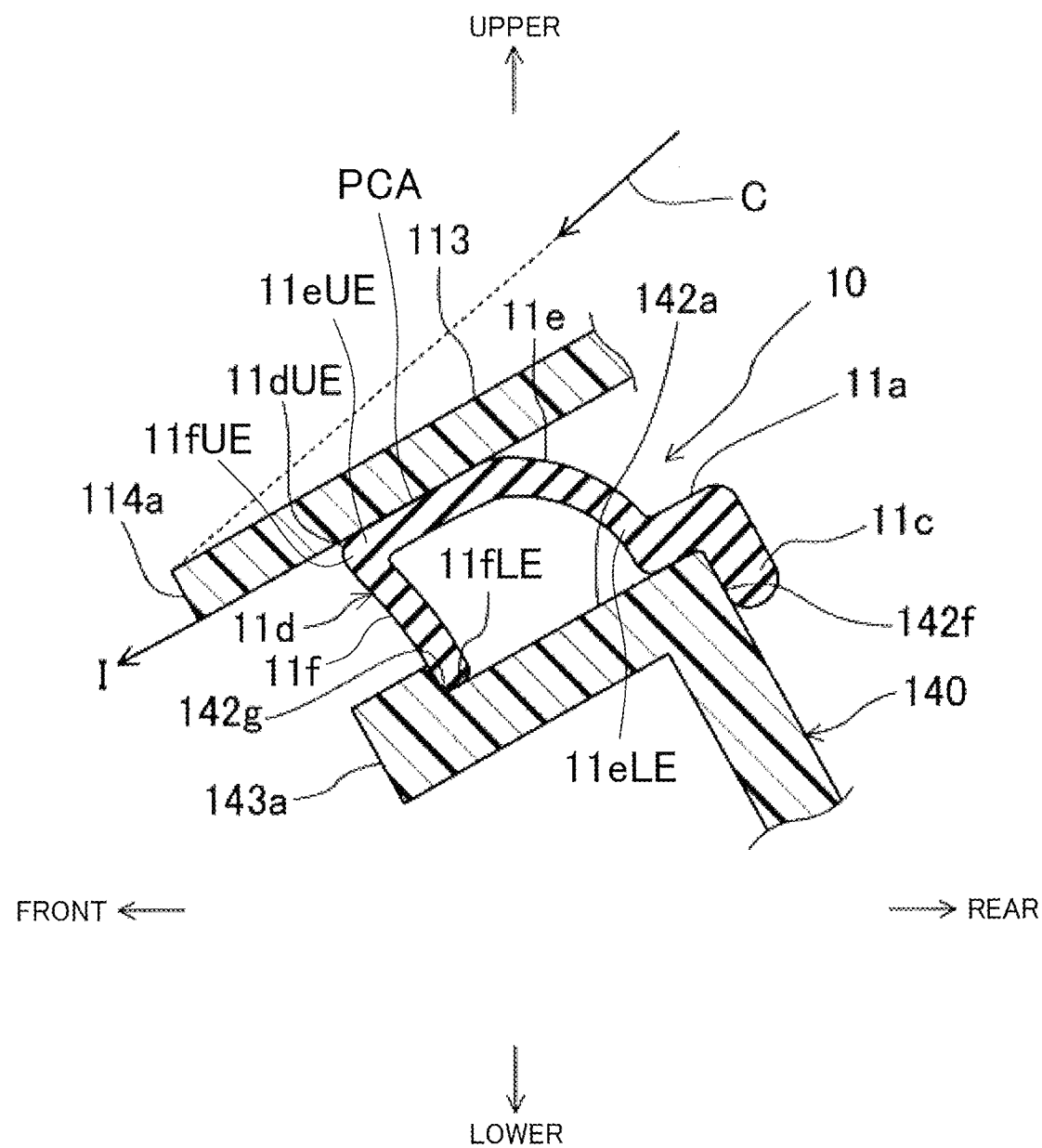
FIG. 13 is a view showing a positional relationship between the cowl and the seal that have already been attached, and which corresponds to FIG. 8.

On the other hand, as shown by the broken line of FIG. 12, the cowl inclined plate 113 is brought into contact with the second front end 11fUE (upper end) of the second lip portion 11f of the upper-side seal lip 11d when a state is reached in which the cowl 110 has been attached. At this time, in the second lip portion 11f of the upper-side seal lip 11d, its second front end 11fUE (upper end) is supported by the first lip portion 11e as shown in FIG. 13. Although the second lip portion 11f of the upper-side seal lip 11d is bent and deformed forwardly (i.e., in the direction of an arrow I that is a direction approaching the center), disadvantageous deformation, such as turn-up, does not occur in the second lip portion 11f, thus enabling the second lip portion 11f to closely adhere to the cowl inclined plate 113.

In other words, the first lip portion 11e of the upper-side seal lip 11d (first seal lip) is bent and deformed in a state of being supported by the second lip portion 11f. A portion, which extends to the first front end 11eUE from a halfway portion between the first front end 11eUE and the first base end 11eLE, of the first lip portion 11e defines the surface contact region PCA that elastically comes into surface contact with the peripheral edge of the cowl opening 114. Therefore, it is possible to reduce or prevent the occurrence of disadvantageous deformation, such as turn-up. Therefore, it is possible to obtain high sealability.

Therefore, the upper-side seal lip 11d, the left-side seal lip 12d, the lower-side seal lip 13d, and the right-side seal lip 14d are all, as intended, enabled to elastically come into contact with the upper edge, the left edge, the lower edge, and the right edge provided around the cowl opening 114. In more detail, only the upper-side seal lip 11d is bent and deformed in a direction (direction of the arrow I) approaching the diagonal center line 10c of the seal 10 as shown in FIG. 7. Additionally, the left-side seal lip 12d, the lower-side seal lip 13d, and the right-side seal lip 14d excluding the upper-side seal lip 11d are each bent and deformed in a direction (direction of the arrow O) away from the diagonal center line 10c of the seal 10.

This enables the upper-side seal lip 11d to maintain high sealability and improve durability without the occurrence of disadvantageous deformation, such as turn-up. Additionally, the second base end 11fLE of the second lip portion 11f of the upper-side seal lip 11d (first seal lip) is brought into contact with and orthogonally presses the shroud inclined surface (upper attachment surface 142a). The shroud inclined surface (upper attachment surface 142a) includes the tier 142g that locks the second base end 11fLE of the second lip portion 11f. This arrangement makes it possible to increase the effect of allowing the second lip portion 11f to support the first lip portion 11e. Therefore, it is possible to achieve an excellent surface-contact state of the surface contact region PCA of the first lip portion 11e, and is possible to further increase sealability.

Additionally, the surface contact region PCA of the first lip portion 11e of the upper-side seal lip 11d, the front end 12dUE of the left-side seal lip 12d, the front end 13dFE of the lower-side seal lip 13d, and the front end 14dUE of the right-side seal lip 14d are located on the same plane defined by the peripheral edge of the cowl opening 114. This arrangement enables the upper-side seal lip 11d, the left-side seal lip 12d, the lower-side seal lip 13d, and the right-side seal lip 14d to closely adhere to the peripheral edge of the cowl opening 114 without gaps, thus enabling these lips to increase sealability.

In the above example embodiments, the structure described with reference to FIG. 7 to FIG. 13 is used. Therefore, when the cowl inclined plate 113 moving in the direction of the arrow C slidably comes into contact with the upper-left seal lip 15d, a portion, which is close to the upper-side seal lip 11d, of the upper-left seal lip 15d is rearwardly bent and deformed. On the other hand, the bent direction changes such that the upper-left seal lip 15d is bent and deformed leftwardly gradually with increasing proximity to the left-side seal lip 12d. Each portion of the upper-left seal lip 15d is also bent and deformed in the direction (direction of the arrow O) away from the center (diagonal center line 10c) of the seal 10.

When the cowl inclined plate 113 moving in the direction of the arrow C slidably comes into contact with the upper-right seal lip 16d, a portion, which is close to the upper-side seal lip 11d, of the upper-right seal lip 16d is rearwardly bent and deformed. The bent direction changes such that the upper-right seal lip 16d is bent and deformed rightwardly gradually with increasing proximity to the right-side seal lip 14d. Each portion of the upper-right seal lip 16d is also bent and deformed in the direction (direction of the arrow O) away from the center (diagonal center line 10c) of the seal 10.

When the cowl inclined plate 113 moving in the direction of the arrow C slidably comes into contact with the lower-left seal lip 17d, a portion, which is close to the lower-side seal lip 13d, of the lower-left seal lip 17d is forwardly bent and deformed. On the other hand, the bent direction changes such that the lower-left seal lip 17d is bent and deformed leftwardly gradually with increasing proximity to the left-side seal lip 12d. Each portion of the lower-left seal lip 17d is also bent and deformed in the direction (direction of the arrow O) away from the center (diagonal center line 10c) of the seal 10.

When the cowl inclined plate 113 moving in the direction of the arrow C slidably comes into contact with the lower-right seal lip 18d, a portion, which is close to the lower-side seal lip 13d, of the lower-right seal lip 18d is forwardly bent and deformed. On the other hand, the bent direction changes such that the lower-right seal lip 18d is bent and deformed rightwardly gradually with increasing proximity to the right-side seal lip 14d. Each portion of the lower-right seal lip 18d is also bent and deformed in the direction (direction of the arrow O) away from the center (diagonal center line 10c) of the seal 10.

Additionally, as has been described with reference to FIG. 12 and FIG. 13, the left-side seal lip 12d, the lower-side seal lip 13d, and the right-side seal lip 14d are each bent and deformed in the direction (direction of the arrow O) away from the center (diagonal center line 10c) of the seal 10.

That is, only the upper-side seal lip 11d is bent and deformed in the direction (direction of the arrow I) approaching the center (diagonal center line 10c) of the seal 10 as shown in FIG. 7. The upper-left seal lip 15d, the left-side seal lip 12d, the lower-left seal lip 17d, the lower-side seal lip 13d, the lower-right seal lip 18d, the right-side seal lip 14d, and the upper-right seal lip 16d excluding the upper-side seal lip 11d are each bent and deformed in the direction (direction of the arrow O) away from the center (diagonal center line 10c) of the seal 10.

Additionally, the shroud 140 includes the lock surface 142f intersecting the upper attachment surface 142a. The seal 10 includes the lock portion 11c that protrudes from the upper-side attachment plate 11a and is locked on the lock surface 142f. This arrangement makes it possible to reduce or prevent a positional deviation of the first base end 11eLE of the first lip portion 11e of the upper-side seal lip 11d when the cowl 110 is attached. Therefore, it is possible to achieve an excellent surface-contact state of the surface contact region PCA of the first lip portion 11e, and is possible to increase sealability.

Additionally, the upper-side attachment plate 11a, the left-side attachment plate 12a, the lower-side attachment plate 13a, and the right-side attachment plate 14a are located on the same plane defined by the upper attachment surface 142a, the left attachment surface 142b, the lower attachment surface 142c, and the right attachment surface 142d of the peripheral edge of the shroud opening 143. This arrangement enables the upper-side attachment plate 11a, the left-side attachment plate 12a, the lower-side attachment plate 13a, and the right-side attachment plate 14a of the base plate BP of the seal 10 to closely adhere to the upper attachment surface 142a, the left attachment surface 142b, the lower attachment surface 142c, and the right attachment surface 142d, respectively, of the peripheral edge of the shroud opening 143 without gaps, thus enabling these plates to increase sealability.

Additionally, the seal 10 further includes the upper-left corner portion 15 between the upper side portion 11 and the left side portion 12, the upper-right corner portion 16 between the upper side portion 11 and the right side portion 14, the lower-left corner portion 17 between the lower side portion 13 and the left side portion 12, and the lower-right corner portion 18 between the lower side portion 13 and the right side portion 14. In this case, it is possible to provide the upper side portion 11, the upper-left corner portion 15, the left side portion 12, the lower-left corner portion 17, the lower side portion 13, the lower-right corner portion 18, the right side portion 14, and the upper-right corner portion 16 to have a rectangular annular shape by consecutively arranging these portions in order.

Additionally, the rectangular annular seal lip SR further includes the upper-left seal lip 15d between the upper-side seal lip 11d and the left-side seal lip 12d, the upper-right seal lip 16d between the upper-side seal lip 11d and the right-side seal lip 14d, the lower-left seal lip 17d between the lower-side seal lip 13d and the left-side seal lip 12d, and the lower-right seal lip 18d between the lower-side seal lip 13d and the right-side seal lip 14d.

The upper-left seal lip 15d, the left-side seal lip 12d, the lower-left seal lip 17d, the lower-side seal lip 13d, the lower-right seal lip 18d, the right-side seal lip 14d, and the upper-right seal lip 16d are each bent and deformed in the direction away from the diagonal center line 10c. In other words, conventional disadvantageous deformation, such as turn-up, does not occur in the upper-left seal lip 15d, the left-side seal lip 12d, the lower-left seal lip 17d, the lower-side seal lip 13d, the lower-right seal lip 18d, the right-side seal lip 14d, and the upper-right seal lip 16d. Particularly, the front end 17dUE of the lower-left seal lip 17d and the front end 18dUE of the lower-right seal lip 18d include r shapes that are concentric with the r shapes of the base ends 17dLE and 18dLE corresponding to the front ends 17dUE and 18dUE, respectively, thus enabling the lower-left seal lip 17d and the lower-right seal lip 18d to be excellently deformed.

According to the above example embodiments, as has been described with reference to FIG. 5 and FIG. 14, it is possible to seal the inside of the triangle whose three sides are the left end of the first lip portion 11e, the rear end of the upper-left seal lip 15d, and the right end of the upper-left attachment plate 15a by the upper-left lid portion 15f. It is possible to seal the inside of the triangle whose three sides are the right end of the first lip portion 11e, the rear end of the upper-right seal lip 16d, and the left end of the upper-right attachment plate 16a by the upper-right lid portion 16f. Therefore, the rigidity and sealability of the seal 10 are improved, and the external appearance of the seal 10 is also improved.

According to the above example embodiments, as have been described with reference to FIG. 8, the die-cut hole NH that communicates with the hollow portion HS is provided in the upper-side attachment plate 11a. The upper-side attachment plate 11a and the second base end 11fLE of the second lip portion 11f of the upper-side seal lip 11d are separated from each other through the die-cut hole NH. Therefore, it is possible to easily perform die cutting through the die-cut hole NH after molding the first lip portion 11e of the hollow upper-side seal lip 11d and the second lip portion 11f. Additionally, the inner surface of the upper-left lid portion 15f and the inner surface of the upper-right lid portion 16f face the die-cut hole NH through the hollow portion HS. Therefore, it is possible to easily perform die cutting after molding the first lip portion 11e, the second lip portion 11f, the upper-left lid portion 15f, and the upper-right lid portion 16f.

Additionally, the left end of the first lip portion 11e and the boundary line L9 of the upper-left lid portion 15f are located at a more leftward position extending rearwardly as shown in FIG. 5 and FIG. 14. The boundary line L10 between the upper-left lid portion 15f and the upper-left attachment plate 15a is located at a more leftward position extending forwardly.

The boundary line L12 between the right end of the first lip portion 11e and the upper-right lid portion 16f is located at a more rightward position extending rearwardly. The boundary line L13 between the upper-right lid portion 16f and the upper-right attachment plate 16a is located at a more rightward position extending forwardly.

With this arrangement, a boundary line L11 between the upper-left lid portion 15f and the upper-left seal lip 15d is located at a more obliquely rightward position extending upwardly. A boundary line L14 between the upper-right lid portion 16f and the upper-right seal lip 16d is located at a more obliquely leftward position extending upwardly. Therefore, because of the presence of the boundary line L11 between the upper-left lid portion 15f and the upper-left seal lip 15d, the upper-left seal lip 15d is bent and deformed in the direction away from the diagonal center line 10c from the base end to the front end. Additionally, because of the presence of the boundary line L14 between the upper-right lid portion 16f and the upper-right seal lip 16d, the upper-right seal lip 16d is bent and deformed in the direction away from diagonal center line 10c from the base end to the front end.

When the upper-side seal lip 11d is bent and deformed in the direction approaching the diagonal center line 10c, the upper-left seal lip 15d and the upper-right seal lip 16d are bent and deformed in the direction approaching the diagonal center line 10c. At this time, the boundary lines L10, L9; L12, L13 between both the right and left sides serve as distinguishing lines, and enable the conversion of the direction in which the seal lip is bent and deformed to be easily performed, and it is possible to reduce or prevent disadvantageous deformation.

According to the above example embodiments, the left-side attachment plate 12a and the right-side attachment plate 14a are able to be fastened to the shroud 140 as has been described with reference to FIG. 7, and therefore the seal 10 is firmly fixed, and positional deviation does not easily occur, and a gap is not easily formed between the shroud 140 and the seal 10.

The aforementioned example embodiments are merely examples in all respects, and should not be restrictively interpreted. Furthermore, variations or changes that belong to the range of equivalency of the claims are all within the scope of the present invention. Although not shown, the present invention is also applicable to a case in which, for example, the shroud opening and the cowl opening are each provided as an opening for intake air of the engine 101. Additionally, the diagonal center line 10c may be leftwardly inclined in the upward direction when seen from the front. Additionally, the diagonal center line 10c may be rightwardly inclined in the upward direction when seen from the front. Additionally, the diagonal center line 10c may be along the up-down direction when seen from the front.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A seal for an outboard motor including a shroud to cover an engine and including a shroud inclined surface inclined with respect to a horizontal direction, and a cowl to cover the shroud from above and including a cowl inclined surface facing the shroud inclined surface and inclined with respect to the horizontal direction, the seal to seal a space between a peripheral edge of a shroud opening in the shroud inclined surface and a peripheral edge of a cowl opening in the cowl inclined surface, the seal comprising:
   a base plate having a rectangular annular shape including a diagonal center line, the base plate including a first attachment plate, a second attachment plate, a third attachment plate, and a fourth attachment plate, the base plate configured to be fixed to the peripheral edge of the shroud such that the first attachment plate is located at a higher position than the third attachment plate when seen from a left-right direction; and
   a rectangular annular seal lip extending from the base plate and located around the diagonal center line and configured to be in elastic contact with the peripheral edge of the cowl opening; wherein
   the rectangular annular seal lip includes:
      a hollow first seal lip including a first lip portion, a second lip portion, and a hollow portion between the first lip portion and the second lip portion;
      the first lip portion including a first base end connected to the first attachment plate and a first front end;
      the second lip portion including a second base end and a second front end, the second base end being closer to the diagonal center line than the first lip portion and configured to be supported by the peripheral edge of the shroud opening, the second front end being connected to the first front end of the first lip portion;
      a second seal lip including a base end connected to the second attachment plate and a front end configured to be in elastic contact with the peripheral edge of the cowl opening;

a third seal lip including a base end connected to the third attachment plate and a front end configured to be in elastic contact with the peripheral edge of the cowl opening; and a fourth seal lip including a base end connected to the fourth attachment plate and a front end configured to be in elastic contact with the peripheral edge of the cowl opening;

each of the second seal lip, the third seal lip, and the fourth seal lip extending away from the diagonal center line with increasing distance toward the front end of each corresponding seal lip from the base end of each corresponding seal lip;

the first lip portion and the second lip portion have a chevron shape in cross-section inclined in mutually opposite directions; and in an attached state to the outboard motor, the first lip portion defines a surface contact region that extends to the first front end from a halfway portion between the first base end and the first front end and elastically contacts with the peripheral edge of the cowl opening.

2. An outboard motor comprising:

a shroud to cover an engine and including a shroud inclined surface inclined with respect to a horizontal direction;

a cowl to cover the shroud from above and including a cowl inclined surface facing the shroud inclined surface and inclined with respect to the horizontal direction; and a seal to seal a space between a peripheral edge of a shroud opening in the shroud inclined surface and a peripheral edge of a cowl opening in the cowl inclined surface; wherein the seal includes:

a base plate fixed to the peripheral edge of the shroud opening and having a rectangular annular shape with a diagonal center line, the base plate including a first attachment plate, a second attachment plate, a third attachment plate, and a fourth attachment plate arranged in a rectangular shape and such that the first attachment plate is located at a higher position than the third attachment plate when seen from a left-right direction; and a rectangular annular seal lip extending from the base plate and located around the diagonal center line in elastic contact with the peripheral edge of the cowl opening;

the rectangular annular seal lip includes:

a first seal lip extending from the first attachment plate;

a second seal lip extending from the second attachment plate;

a third seal lip extending from the third attachment plate; and a fourth seal lip extending from the fourth attachment plate;

the first seal lip includes:

a first lip portion including a first base end connected to the first attachment plate and a first front end;

a second lip portion including a second base end and a second front end, the second base end being closer to the diagonal center line than the first lip portion and supported by the peripheral edge of the shroud opening, the second front end being connected to the first front end of the first lip portion; and a hollow portion between the first lip portion and the second lip portion;

the first lip portion and the second lip portion have a chevron shape in cross-section inclined in mutually opposite directions;

the first lip portion includes a surface contact region that extends to the first front end from a halfway portion between the first base end and the first front end and elastically contacts the peripheral edge of the cowl opening;

the second seal lip includes a base end connected to the second attachment plate and a front end in elastic contact with the peripheral edge of the cowl opening, the front end extending away from the diagonal center line with increasing distance from the base end;

the third seal lip includes a base end connected to the third attachment plate and a front end in elastic contact with the peripheral edge of the cowl opening, the front end extending away from the diagonal center line with increasing distance from the base end; and the fourth seal lip includes a base end connected to the fourth attachment plate and a front end in elastic contact with the peripheral edge of the cowl opening, the front end extending away from the diagonal center line with increasing distance from the base end.

3. The outboard motor according to claim 2, wherein the second base end of the second lip portion of the first seal lip presses against the shroud inclined surface; and the shroud inclined surface includes a step to lock the second base end of the second lip portion.

4. The outboard motor according to claim 2, wherein the surface contact region of the first lip portion of the first seal lip, the front end of the second seal lip, the front end of the third seal lip, and the front end of the fourth seal lip are located on a same plane defined by the peripheral edge of the cowl opening.

5. The outboard motor according to claim 2, wherein the first attachment plate includes a mold removal hole in communication with the hollow portion of the first seal lip; and the second base end of the second lip portion of the first seal lip is separate from the first attachment plate through the mold removal hole.

6. The outboard motor according to claim 2, wherein the first attachment plate is located at a more rearward position and a more upward position than the third attachment plate when seen from the left-right direction;

the seal includes:

an upper side portion including an upper-side attachment plate as the first attachment plate and an upper-side seal lip as the first seal lip;

a left side portion including a left-side attachment plate as the second attachment plate and a left-side seal lip as the second seal lip;

a lower side portion including a lower-side attachment plate as the third attachment plate and a lower-side seal lip as the third seal lip; and a right side portion including a right-side attachment plate as the fourth attachment plate and a right-side seal lip as the fourth seal lip;

the peripheral edge of the shroud opening includes an upper attachment surface, a left attachment surface, a lower attachment surface, and a right attachment surface; and the upper-side attachment plate, the left-side attachment plate, the lower-side attachment plate, and the right-side attachment plate are attached to the upper attachment surface, the left attachment surface, the lower attachment surface, and the right attachment surface of the peripheral edge of the shroud opening, respectively.

7. The outboard motor according to claim 6, wherein the seal includes a lock that protrudes from the upper-side attachment plate and is locked to a surface of the shroud.

8. The outboard motor according to claim 6, wherein the upper-side attachment plate, the left-side attachment plate, the lower-side attachment plate, and the right-side attachment plate are located on a same plane defined by the upper attachment surface, the left attachment surface, the lower attachment surface, and the right attachment surface of the peripheral edge of the shroud opening.

9. The outboard motor according to claim 6, wherein
the seal further includes an upper-left corner portion between the upper side portion and the left side portion, an upper-right corner portion between the upper side portion and the right side portion, a lower-left corner portion between the lower side portion and the left side portion, and a lower-right corner portion between the lower side portion and the right side portion; and
the upper side portion, the upper-left corner portion, the left side portion, the lower-left corner portion, the lower side portion, the lower-right corner portion, the right side portion, and the upper-right corner portion define a rectangular annular shape.

10. The outboard motor according to claim 9, wherein
the rectangular annular seal lip further includes an upper-left seal lip between the upper-side seal lip and the left-side seal lip, an upper-right seal lip between the upper-side seal lip and the right-side seal lip, a lower-left seal lip between the lower-side seal lip and the left-side seal lip, and a lower-right seal lip between the lower-side seal lip and the right-side seal lip;
the base plate further includes an upper-left attachment plate between the upper-side attachment plate and the left-side attachment plate, an upper-right attachment plate between the upper-side attachment plate and the right-side attachment plate, a lower-left attachment plate between the lower-side attachment plate and the left-side attachment plate, and a lower-right attachment plate between the lower-side attachment plate and the right-side attachment plate;
the upper-left seal lip, the upper-right seal lip, the lower-left seal lip, and the lower-right seal lip are in elastic contact with the peripheral edge of the cowl opening;
the upper-left seal lip includes a base end and a front end, the base end being located on the upper-left attachment plate and having an r shape;
the upper-right seal lip includes a base end and a front end, the base end being located on the upper-right attachment plate and having an r shape;
the lower-left seal lip includes a base end and a front end, the base end being located on the lower-left attachment plate and having an r shape;
the lower-right seal lip includes a base end and a front end, the base end being located on the lower-right attachment plate and having an r shape;
each of the upper-left seal lip, the upper-right seal lip, the lower-left seal lip, and the lower-right seal lip has a shape extending away from the diagonal center line with increasing proximity to the front end of each corresponding seal lip from the base end of each corresponding seal lip; and
the front end of the lower-left seal lip and the front end of the lower-right seal lip each include an r shape concentric with the r shape of the base end.

11. The outboard motor according to claim 10, wherein the seal further includes:
an upper-left lid portion to seal an inside of a triangle whose three sides are a left end of the first lip portion of the first seal lip, a rear end of the upper-left seal lip, and a right end of the upper-left attachment plate; and
an upper-right lid portion to seal an inside of a triangle whose three sides are a right end of the first lip portion, a rear end of the upper-right seal lip, and a left end of the upper-right attachment plate;
the upper-side attachment plate includes a mold removal hole to communicate with the hollow portion of the first seal lip;
the second base end of the second lip portion of the first seal lip is separate from the upper-side attachment plate; and
an inner surface of the upper-left lid portion and an inner surface of the upper-right lid portion face the mold removal hole through the hollow portion.

12. The outboard motor according to claim 11, wherein
a boundary line between a left end of the first lip portion and the upper-left lid portion is located more leftward extending rearwardly;
a boundary line between the upper-left lid portion and the upper-left attachment plate is located more leftward extending forwardly;
a boundary line between a right end of the first lip portion and the upper-right lid portion is located more rightward extending rearwardly; and
a boundary line between the upper-right lid portion and the upper-right attachment plate is located more rightward extending forwardly.

13. The outboard motor according to claim 6, further comprising:
a plurality of fasteners each of which fastens the base plate to the shroud; wherein
each of at least the left-side attachment plate or the right-side attachment plate of the base plate includes a through-hole through which the corresponding fastener is inserted.

* * * * *